(12) United States Patent
Frantz et al.

(10) Patent No.: US 9,168,708 B2
(45) Date of Patent: Oct. 27, 2015

(54) METHOD OF FORMING A LIGHT WEIGHT THERMOPLASTIC FLEX FOAM AND HYBRID DUCT SYSTEM

(71) Applicant: The Boeing Company, Chicago, IL (US)

(72) Inventors: Walter Forrest Frantz, Parkdale, OR (US); Jayant D. Patel, Lake Forest, CA (US); Douglas Dean Maben, Snohomish, WA (US); Bruce Whitman, Lorain, OH (US); Douglas E. Freeman, Lorain, OH (US)

(73) Assignee: THE BOEING COMPANY, Chicago, IL (US)

( * ) Notice: Subject to any disclaimer, the term of this patent is extended or adjusted under 35 U.S.C. 154(b) by 159 days.

(21) Appl. No.: 13/922,246

(22) Filed: Jun. 20, 2013

(65) Prior Publication Data
US 2013/0276959 A1 Oct. 24, 2013

Related U.S. Application Data

(62) Division of application No. 11/763,427, filed on Jun. 14, 2007.

(51) Int. Cl.
*B29D 23/00* (2006.01)
*B29C 53/38* (2006.01)
(Continued)

(52) U.S. Cl.
CPC .............. *B29D 23/001* (2013.01); *B29C 53/38* (2013.01); *B29C 66/1122* (2013.01); *B29C 66/13* (2013.01); *B29C 66/20* (2013.01); *B29C 66/221* (2013.01); *B29C 66/2272* (2013.01); *B29C 66/2276* (2013.01); *B29C 66/4322* (2013.01); *B29C 66/54* (2013.01); *B29C 66/547* (2013.01); *B29C 66/5474* (2013.01); *B29C 66/727* (2013.01); *F16L 9/12* (2013.01); (Continued)

(58) Field of Classification Search
CPC .. B29C 66/13; B29C 66/4322; B29C 66/166; B29C 66/1286
USPC ............. 454/244, 254, 76; 428/60, 119, 36.5; 138/125, 128, 156; 264/239; 156/73.5, 156/349
See application file for complete search history.

(56) References Cited

U.S. PATENT DOCUMENTS 2,674,297 A 4/1954 Greenwald
2,767,436 A * 10/1956 Noland et al. ................. 264/321
(Continued)

FOREIGN PATENT DOCUMENTS

DE 3620791 A1 12/1987
DE 3620791 A1 * 12/1987 .............. F16L 59/14
(Continued)

OTHER PUBLICATIONS

Zotetek product information, ZOTEFOAMS plc, Mar. 18, 2005; http:// web.archive.org of www.zotefoams.com.*
(Continued)

*Primary Examiner* — Steven B McAllister
*Assistant Examiner* — Frances F Hamilton
(74) *Attorney, Agent, or Firm* — Yee & Associates, P.C.

(57) ABSTRACT

A method of forming a closed cell thermoplastic foam duct and a method of forming a duct and attaching it to an aircraft environmental control system. The environmental control system includes a duct made of closed cell thermoplastic foam, such as polyvinylidene fluoride foam.

6 Claims, 21 Drawing Sheets

(51) Int. Cl.

| | | |
|---|---|---|
| *B29C 65/00* | (2006.01) | |
| *F16L 9/12* | (2006.01) | |
| *F16L 9/17* | (2006.01) | |
| *F16L 11/08* | (2006.01) | |
| *B29C 51/00* | (2006.01) | |
| *B29K 27/00* | (2006.01) | |
| *B29K 101/12* | (2006.01) | |
| *B29K 105/04* | (2006.01) | |
| *B29L 31/30* | (2006.01) | |
| *B29C 65/78* | (2006.01) | |

(52) U.S. Cl.
CPC ....... *F16L 9/17* (2013.01); *F16L 11/08* (2013.01); *B29C 51/00* (2013.01); *B29C 65/7847* (2013.01); *B29C 66/128* (2013.01); *B29C 66/14* (2013.01); *B29C 66/5221* (2013.01); *B29C 66/5344* (2013.01); *B29C 66/919* (2013.01); *B29C 66/9141* (2013.01); *B29C 66/91411* (2013.01); *B29C 66/91945* (2013.01); *B29C 66/929* (2013.01); *B29C 66/949* (2013.01); *B29C 66/9534* (2013.01); *B29K 2027/16* (2013.01); *B29K 2101/12* (2013.01); *B29K 2105/04* (2013.01); *B29L 2031/3076* (2013.01); *Y10T 156/1038* (2015.01)

(56) References Cited

U.S. PATENT DOCUMENTS

| | | | | |
|---|---|---|---|---|
| 2,784,129 | A * | 3/1957 | Stephens | 138/128 |
| 2,929,161 | A | 3/1960 | Kuyk | |
| 3,095,337 | A | 6/1963 | Chase | |
| 3,107,697 | A | 10/1963 | Daggett et al. | |
| 3,230,803 | A * | 1/1966 | Guilford | 82/46 |
| 3,289,702 | A | 12/1966 | Sherburne | |
| 3,391,051 | A * | 7/1968 | Ehrenfreund et al. | 428/159 |
| 3,419,447 | A * | 12/1968 | Hewitt | 156/73.3 |
| 3,575,769 | A * | 4/1971 | Radzio | 156/466 |
| 3,799,820 | A * | 3/1974 | Sollerud | 156/69 |
| 3,799,859 | A * | 3/1974 | Wallin | 204/216 |
| 4,196,755 | A * | 4/1980 | Kutnyak et al. | 138/150 |
| 4,251,907 | A | 2/1981 | Bleckmann et al. | |
| 4,304,747 | A * | 12/1981 | Lake | 264/156 |
| 4,410,065 | A * | 10/1983 | Harvey | 181/224 |
| 4,447,378 | A * | 5/1984 | Gray et al. | 264/45.9 |
| 4,448,824 | A * | 5/1984 | Holmes et al. | 428/33 |
| 4,566,932 | A * | 1/1986 | McGuire | 156/154 |
| 4,576,846 | A * | 3/1986 | Noel | 428/36.5 |
| 4,615,411 | A | 10/1986 | Breitscheidel et al. | |
| 4,693,856 | A | 9/1987 | Rubens et al. | |
| 4,830,059 | A | 5/1989 | Silberstang | |
| 4,874,648 | A | 10/1989 | Hill et al. | |
| 4,907,626 | A * | 3/1990 | Mori | 138/156 |
| 5,124,095 | A * | 6/1992 | Gianni et al. | 264/45.5 |
| 5,210,947 | A | 5/1993 | Donnelly | |
| 5,344,904 | A * | 9/1994 | Wakamori et al. | 526/254 |
| 5,393,105 | A | 2/1995 | Petterson et al. | |
| 5,424,112 | A | 6/1995 | Kataoka et al. | 428/156 |
| 5,478,627 | A | 12/1995 | Hara et al. | |
| 5,526,849 | A * | 6/1996 | Gray | 138/133 |
| 5,714,290 | A * | 2/1998 | Yu et al. | 430/56 |
| 5,795,634 | A | 8/1998 | Fukui | |
| 5,944,060 | A * | 8/1999 | MacKay | 138/140 |
| 6,105,621 | A | 8/2000 | Primich | |
| 6,179,009 | B1 | 1/2001 | Fukui | |
| 6,306,235 | B1 * | 10/2001 | Henderson | 156/195 |
| 6,365,253 | B1 * | 4/2002 | Primeau et al. | 428/36.9 |
| 6,461,695 | B1 | 10/2002 | Schaap | |
| 6,540,401 | B2 * | 4/2003 | Allan | 383/107 |
| 6,562,447 | B2 * | 5/2003 | Wu et al. | 428/305.5 |
| 6,579,170 | B1 | 6/2003 | Davis | |
| 6,679,296 | B2 | 1/2004 | Gibson | |
| 6,806,427 | B2 * | 10/2004 | Kadotani et al. | 174/70 C |
| 6,830,076 | B1 | 12/2004 | Patel | |
| 6,843,276 | B2 | 1/2005 | Tadokoro | |
| 7,014,450 | B2 | 3/2006 | Bergsma et al. | |
| 7,112,054 | B2 * | 9/2006 | Frantz et al. | 425/329 |
| 7,157,034 | B2 | 1/2007 | Bristow et al. | |
| 7,193,029 | B2 | 3/2007 | Hayes | |
| 7,431,196 | B2 | 10/2008 | Eilert et al. | |
| 7,549,310 | B2 | 6/2009 | Donnelly | |
| 7,731,817 | B2 | 6/2010 | Hethcock et al. | |
| 7,780,805 | B2 * | 8/2010 | Darcy et al. | 156/73.3 |
| 7,878,550 | B2 * | 2/2011 | Patel et al. | 285/235 |
| 7,918,955 | B2 | 4/2011 | Donnelly | |
| 8,002,110 | B2 * | 8/2011 | DeGroot et al. | 198/844.2 |
| 8,287,684 | B2 * | 10/2012 | Henderson et al. | 156/308.2 |
| 8,336,925 | B2 | 12/2012 | Paquet et al. | |
| 2002/0002208 | A1 * | 1/2002 | Martel et al. | 521/45.5 |
| 2002/0157786 | A1 * | 10/2002 | Tarnawskyj et al. | 156/304.5 |
| 2002/0172835 | A1 | 11/2002 | Pai | |
| 2002/0181715 | A1 * | 12/2002 | Kang | 381/71.5 |
| 2003/0075228 | A1 * | 4/2003 | Tippett | 138/125 |
| 2003/0172981 | A1 * | 9/2003 | Gibson | 138/131 |
| 2004/0050487 | A1 * | 3/2004 | Frantz et al. | 156/304.2 |
| 2004/0161563 | A1 * | 8/2004 | Wellman | 428/36.91 |
| 2004/0231976 | A1 | 11/2004 | Gadini et al. | |
| 2005/0163956 | A1 | 7/2005 | Takashima et al. | |
| 2006/0051547 | A1 | 3/2006 | Lim et al. | |
| 2006/0278555 | A1 * | 12/2006 | Langer et al. | 206/523 |
| 2007/0079884 | A1 * | 4/2007 | Tomerlin et al. | 138/112 |
| 2008/0041249 | A1 | 2/2008 | D'Hauwe | |
| 2008/0060713 | A1 | 3/2008 | Donnelly | |
| 2008/0233855 | A1 | 9/2008 | Baudouin et al. | |
| 2008/0308674 | A1 | 12/2008 | Frantz et al. | |
| 2009/0104399 | A1 * | 4/2009 | Field | 428/119 |

FOREIGN PATENT DOCUMENTS

| | | |
|---|---|---|
| DE | 202004011025 U1 | 9/2004 |
| EP | 0250002 A1 | 12/1987 |
| WO | WO2004110738 A2 | 12/2004 |
| WO | WO2005105907 A1 | 11/2005 |

OTHER PUBLICATIONS

Zotefoams Zotek (R) F brand foam products technical information sheet TIS 01F, pp. 1-9 of 9, ZOTEFOAMS plc, May 2014; www.zotefoams.com.*

Office Action, dated Nov. 25, 2011, regarding U.S. Appl. No. 11/763,427, 17 pages.

Final Office Action, dated May 30, 2012, regarding U.S. Appl. No. 11/763,427, 16 pages.

Office Action, dated Mar. 15, 2013, regarding U.S. Appl. No. 11/763,427, 13 pages.

* cited by examiner

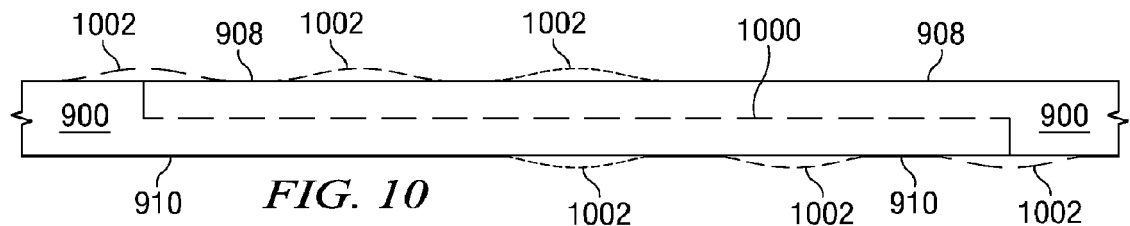
*FIG. 10*
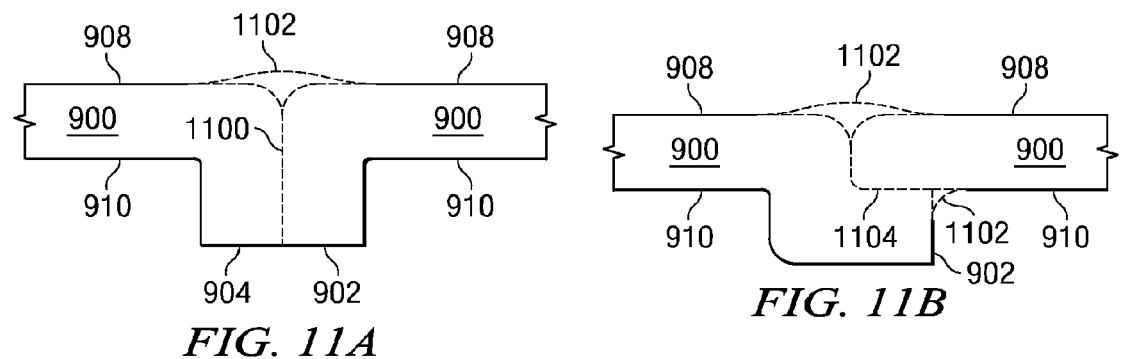
*FIG. 11A*  *FIG. 11B*
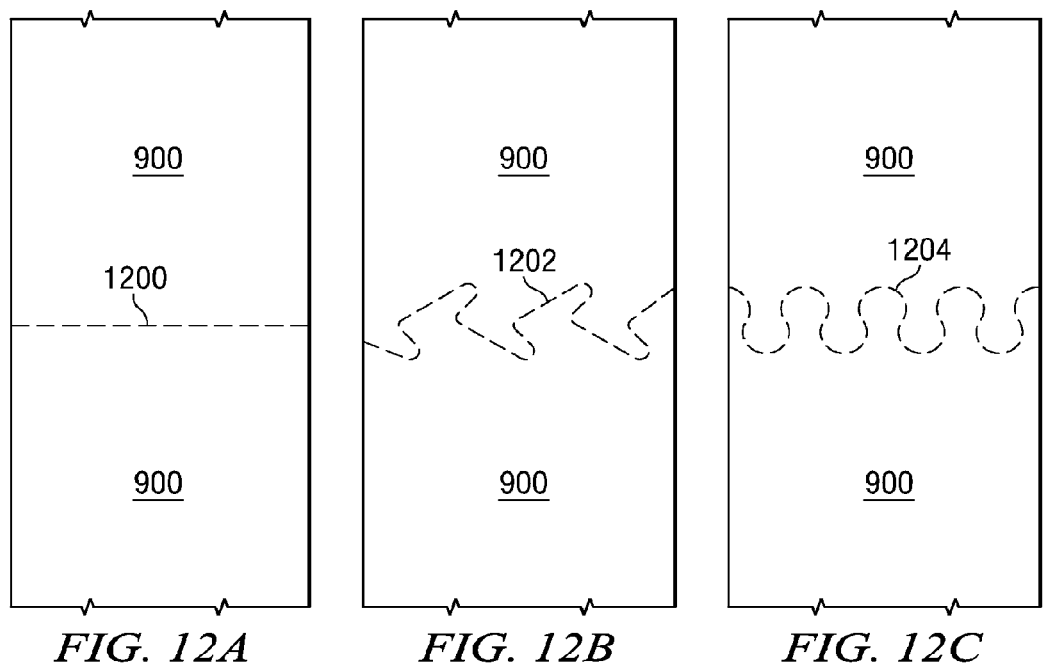
*FIG. 12A*  *FIG. 12B*  *FIG. 12C*

| HOSE DIAMETER (INCHES) | POLYETHERIMIDE (ULTEM) (INCHES) | | PITCH (INCHES) | |
|---|---|---|---|---|
| | HOLLOW | SOLID | HOLLOW | SOLID |
| 0.75 | | 0.06 | 0.25 | 0.25 |
| 1.00-1.25 | | 0.06 | 0.25 | 0.25 |
| 1.50 | 0.08 | 0.08 | 0.25 | 0.25 |
| 1.75-2.50 | 0.09 | 0.09 | 0.25/0.37 | 0.25/0.37 |
| 3.00 | 0.09 | 0.09 | 0.37 | 0.37 |
| 3.50-4.00 | 0.09 | 0.09 | 0.37/0.50 | 0.37/0.50 |
| 4.50-5.50 | 0.09/0.12 | 0.09/0.12 | 0.50 | 0.50 |
| 5.50-7.50 | 0.12 | 0.12 | 0.62/0.75 | 0.62/0.75 |
| 8.00-9.00 | 0.15 | 0.15 | 0.75/0.87 | 0.75/0.87 |
| 9.50-12.00 | 0.15/0.18 | 0.15/0.18 | 0.95 | 0.95 |

*FIG. 18*

| BEND ANGLE NOMINAL | BEND ANGLE MAX | MINIMUM NUMBER OF HELIX REVOLUTIONS |
|---|---|---|
| 15° | 20° | 5 |
| 30° | 38° | 6 |
| 45° | 55° | 7 |
| 90° | 120° | 9 |

*FIG. 19*

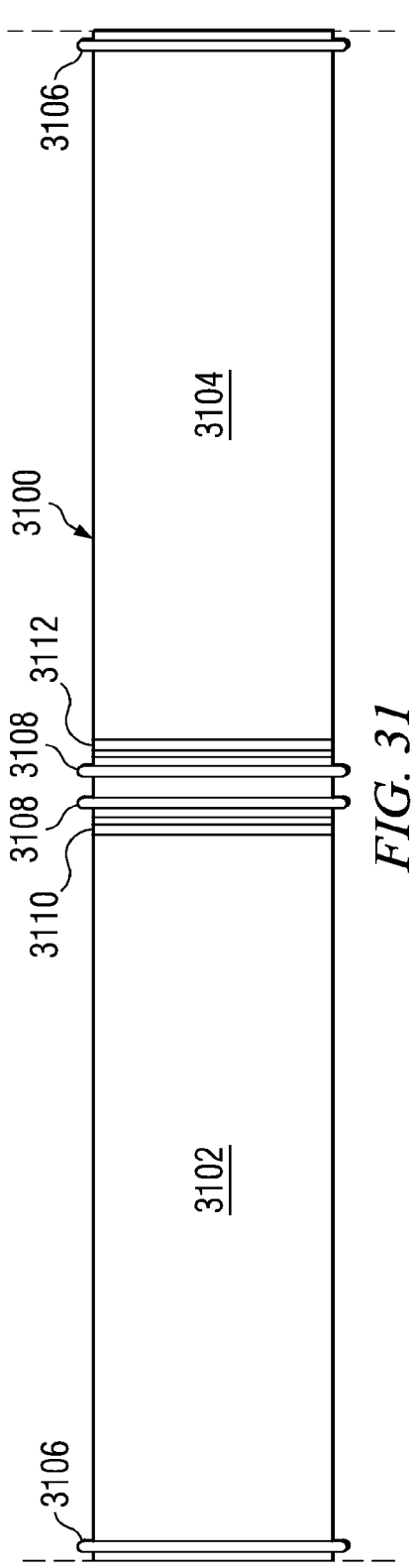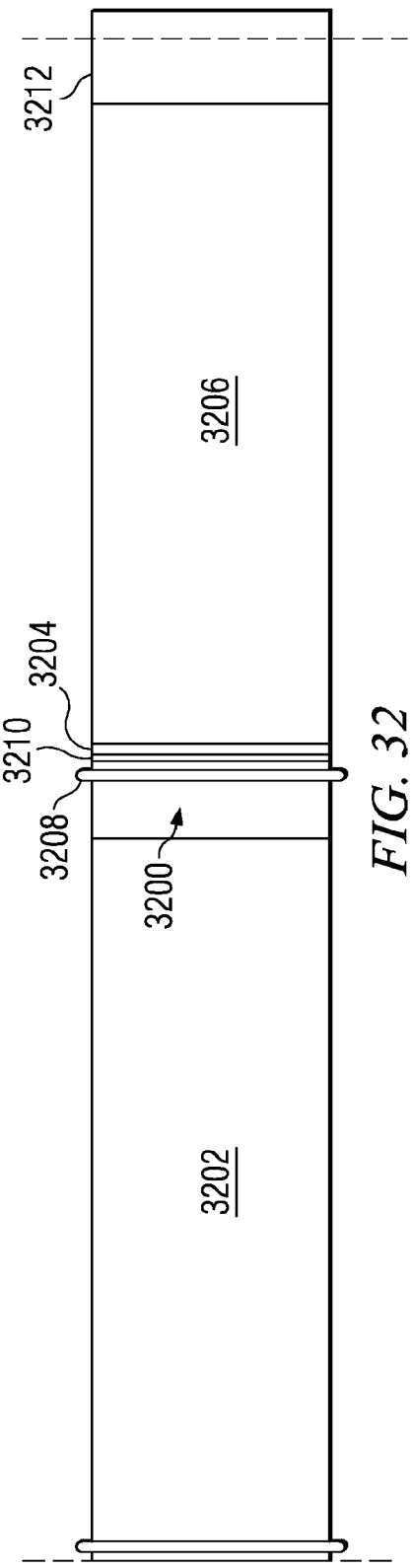

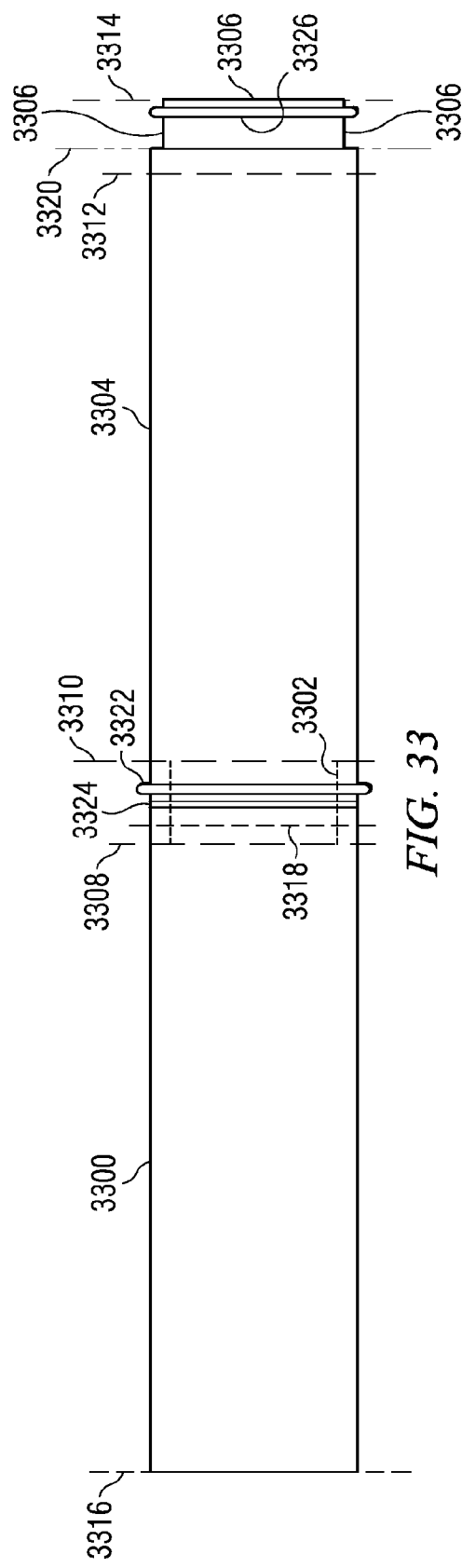
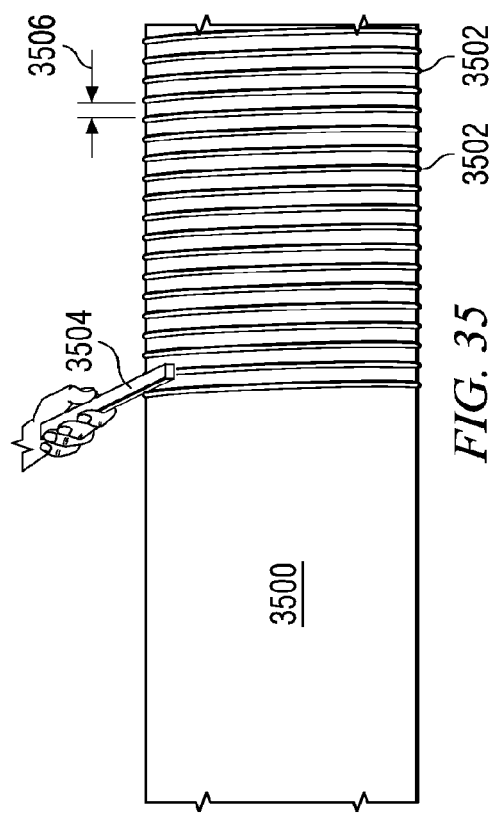
FIG. 33
FIG. 35

METHOD OF FORMING A LIGHT WEIGHT THERMOPLASTIC FLEX FOAM AND HYBRID DUCT SYSTEM

This application is a divisional of application number 11/763,427, filed Jun. 14, 2007, status pending.

BACKGROUND INFORMATION

1. Field

The advantageous embodiments described herein relate to closed and semi-closed containers that receive internal or external pressure. More particularly, the advantageous embodiments described herein relate to ducts and methods of making duct systems, and still more particularly, toward duct systems used in aerospace vessels, such as aerospace vessels, helicopters, rockets, space vessels, and others.

2. Background

Modern aerospace vessels contain numerous ducts of various forms to create a safe environment for people, animals, and equipment in hostile environments found in and around aerospace vessels. For example, in a typical midsize passenger airplane over 500 duct variants can be found. Ducts are used to provide cabin air conditioning, cockpit cooling, ram air cargo heating, water separation, avionic cooling, deicing, air trim, auxiliary power, recirculation systems, exhaust systems, and positive pressure in the cabin to deter the entry of smoke from a cargo fire. Thus, the environmental control duct system of an airplane is complex and adds significant weight to an airplane. Economizing weight is always of great concern to airplane designers because a single pound can impact the value of an aerospace vessel significantly. The weight of the aerospace vessel is important because heavier aerospace vessel intrinsically require more fuel and can carry fewer passengers or cargo relative to lighter aerospace vessel of the same design. These same concerns exist with respect to nearly all aerospace vessels to a greater or lesser degree.

The processes and materials for conventional duct manufacturing and assembly can be expensive and possibly ineffective. Conventional ducts, such as metallic ducts, are heavy, costly to tool and fabricate, assemble, maintain, and have difficulty meeting stringent requirements, such as Federal Aviation Administration requirements.

Plastic ducts are used in an environmental control system of an aerospace vessel. However, plastic ducts also have disadvantages in some cases, such as geometry limitations, the potential requirement for flanges for bonding, inconsistent wall thicknesses, weight, and solvent stress factors.

Ducts made of reinforced composite materials are also used in an environmental control system of an aerospace vessel. However, reinforced composites also have several disadvantages. For example, many composites transmit noise and require expensive materials and tools, as well as a great deal of time and labor to process. Composites are also subject to micro damage when handled and stricter alignment tolerances.

SUMMARY

A solution to the problems identified above regarding manufacturing of ducts for aerospace vessels is to manufacture the ducts using thermoplastic foam. As a result, an environmental control system of an aerospace vessel has a lighter weight, is self compensating to accommodate airplane variability, has noise dampening features, lower costs, is damage tolerant, insulated, and is easier to manufacture.

In an advantageous embodiment, a foam duct is provided. The foam duct begins as a thermoplastic foam sheet having properties suitable for use in an environmental control system of an aerospace vessel. The foam duct can also be used in an environmental control system of other aerospace vessels, boats, buildings, automobiles, spacecraft, or other areas where an environmental control system is established. The thermoplastic foam sheet has a crenulated and beveled first edge and a beveled second edge. The duct is formed by interlocking the crenulated and beveled first edge with the beveled second edge. In alternative embodiments, the first edge and second edge may or may not be crenulated and/or beveled.

In an advantageous embodiment, a vessel is provided. The vessel includes a body or fuselage, and an environmental control system and cabin within the fuselage that provides conditioned air to the equipment and structures that protect people, animals, and equipment from outside elements. The environmental control system includes a duct made of polyvinylidene fluoride (PVDF) foam.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 10 shows side view variants of foam duct seams formed with mitered edges of a foam sheet adhesively bonded together, in accordance with an advantageous embodiment;

FIG. 11A shows formation of an angled butt seam, in accordance with an advantageous embodiment;

FIG. 11B shows formation of an overlapped butt seam, in accordance with an advantageous embodiment;

FIG. 12A shows a simple seam pattern, in accordance with an advantageous embodiment;

FIG. 12B shows an interlocking foot pattern seam, in accordance with an advantageous embodiment;

FIG. 12C shows an interlocking crenulated seam, in accordance with an advantageous embodiment;

FIG. 18 is a table relating helix and helical pitch relationships to diameters of ducts, in accordance with an advantageous embodiment;

FIG. 19 is a table showing numbers of helix revolutions to achieve various duct bend angles, in accordance with an advantageous embodiment;

FIG. 31 illustrates joining of conventional ducts for an aerospace vessel environmental control system using a joining system, in accordance with an advantageous embodiment;

FIG. 32 shows two ducts joined by a foam sleeve, in accordance with an advantageous embodiment;

FIG. 33 shows a method of joining foam ducts using integral foam sleeves and composite cuffs, in accordance with an advantageous embodiment;

FIG. 35 shows a duct around which is wound a preformed helix wire, in which a pitch bar is used to form the wire into a helix, in accordance with an advantageous embodiment;

DETAILED DESCRIPTION

The advantageous embodiments described herein provide for use of foam ducts in vessels where people, animals, and equipment need to be protected from the external environment. Particularly, the embodiments described herein are for use in an environmental control system of an aerospace vessel or other aerospace vessel. An aerospace vessel environmental control system formed from all or some of the embodiments described herein is lighter weight, self compensating to accommodate airplane variability, has advantageous noise dampening properties, costs less money, is damage tolerant, self insulating, reduces tooling costs, is flexible during installation and use, can be formed into longer length segments, substantially reduces or eliminates assembly and attachment hardware, and eliminates ECS related scrap and disposal of waste materials.

In an advantageous embodiment, a foam environmental control system can include a combination of different materials layered or co-cured together to achieve a desired product. Layers of the same material can also be co-cured together to achieve a desired product. Additionally, the foam ducts can be formed into helical reinforced ducts to impart flexibility for bending, torsional movement, and axial movement, while simultaneously maintaining desired stiffness.

Figure 1:
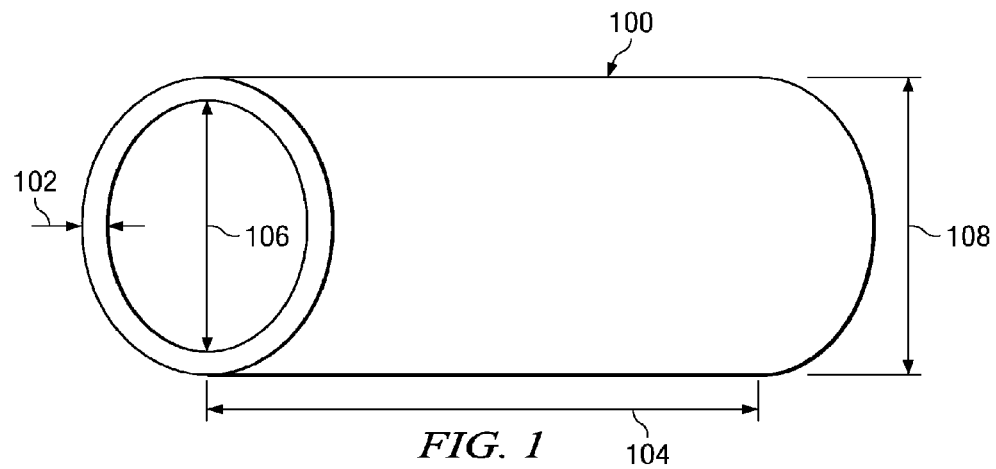
FIG. 1 shows a duct that can be used in an environmental control system of an aerospace vessel, in accordance with an advantageous embodiment.

FIG. 1 shows a duct that can be used in an environmental control system of an aerospace vessel, in accordance with an advantageous embodiment. Foam duct 100 is fashioned from foam sheets and can be used in a duct system of an aerospace vessel. Foam duct 100 has a thickness as shown between arrows 102, a length as shown between arrows 104, an inner diameter as shown between arrows 106, and an outer diameter as shown between arrows 108.

In an advantageous embodiment, foam duct 100 is formed from thermoplastic closed cell foam, such as polyvinylidene fluoride (PVDF). While PVDF foam tubes have been used for insulation covers, known PVDF tubes cannot withstand significant pressure differentials between the inside and outside skins of the vessel without breaking or leaking. Additionally, no known PDVF tube seams are durable enough to withstand prolonged pressure cycling or abuse. Additionally, known PVDF tubes could not be fashioned into some complex shapes commonly used in environmental control system ducts and plenums for use on an aerospace vessel.

Foam duct 100 is formed from a thermoplastic foam sheet having properties suitable for use in an environmental control system of an aerospace vessel. These properties include those properties of ducts required by the Federal Aviation Administration, such as, for example, with regard to flammability. Other properties that render a foam sheet suitable for use in an environmental control system of an aerospace vessel include low weight relative to all possible duct materials, sufficient strength to resist tearing, leak resistance, and resistance to water.

In an advantageous embodiment, foam duct 100 is formed from a sheet sized according to a formula specifically developed to account for engineering tolerances used in environmental control system ducts of an aerospace vessel, particularly with regard to internal pressures and strength of foam duct 100. The dimensions of the sheet can be defined by equation (1):

$$W = \pi(d + 2t(1 - 0.045d)) + O \quad (1)$$

In equation (1), "W" is the width of the sheet that will ultimately be formed into foam duct 100. Also in equation one, "d" is the inside diameter of foam duct 100, which corresponds to the inside diameter shown by arrow 106. Additionally, "t" is the thickness of the foam duct wall, as shown by arrows 102. "O" is the overlap between edges of the sheet once the sheet is wrapped around a mandrel. The value of "O" is typically set to approximately 0.75 inches, though the value of "O" can be greater.

In an advantageous embodiment, foam duct 100 is made of closed cell foam and specifically made of one of PVDF F30 and PVDF F38 grade foams. Other suitable thermoplastic closed cell foams can be used for aerospace vessel environmental control systems, as long as such foams meet Federal Aviation Administration requirements, such as flammability requirements.

Figure 2:
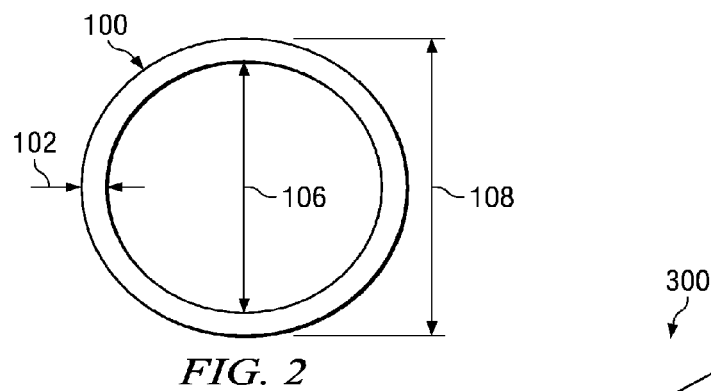
FIG. 2 shows a cross section of the duct shown in FIG. 1, in accordance with an advantageous embodiment.

FIG. 2 shows a cross section of the duct shown in FIG. 1, in accordance with an advantageous embodiment. Again, arrow 106 shows the inside diameter of foam duct 100, arrows 102 shows the thickness of foam duct 100, and arrow 108 shows an outside diameter of foam duct 100. However, the cross section can represent a single sheet or one or more sheets of foam thermally bonded together to form a single sheet. In this embodiment, a sheet shall mean a single sheet or multiple sheets adhesively or thermally, joined together either partially or fully.

Figure 3:
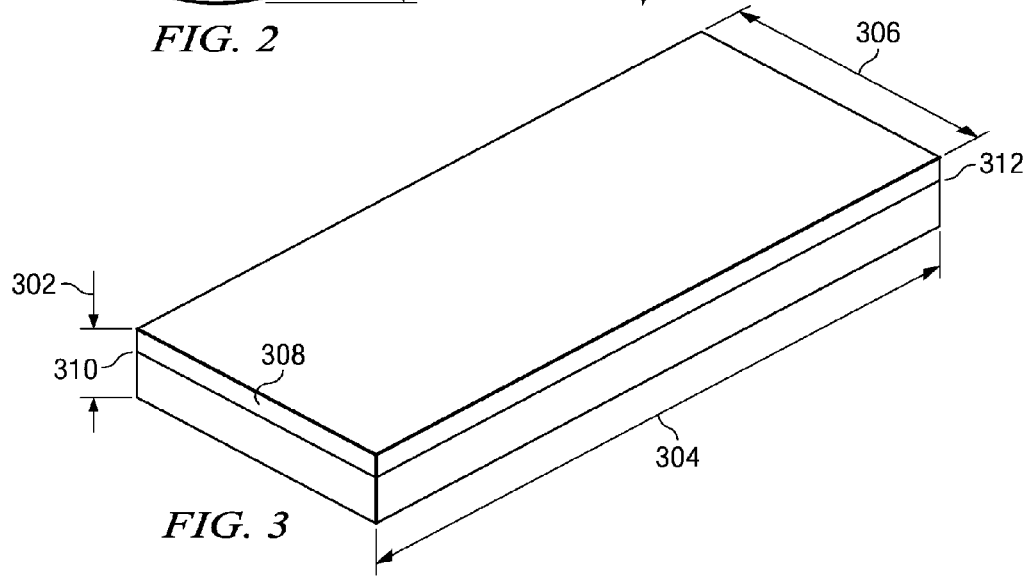
FIG. 3 shows a bun and a sheet skived from the bun for use in constructing a duct for an environmental control system of an aerospace vessel, in accordance with an advantageous embodiment.

FIG. 3 shows a bun and a sheet skived from the bun for use in constructing a duct for an environmental control system of an aerospace vessel, in accordance with an advantageous embodiment. Bun 300 is expanded into foam from a polyvinylidene fluoride (PVDF) sheet. In an advantageous embodiment, a commercial bun is approximately 25.4 millimeters thick along arrows 302, about two meters long along arrows 304, and about one meter wide along arrows 306. However, manufactured buns, such as bun 300, are also available in different widths, lengths, and thicknesses.

In an advantageous embodiment, bun 300 is skived into one or more sheets. In an advantageous embodiment, sheet 308 is skived from bun 300, as shown along phantom lines 310 and 312. Sheet 308 can also be described as being cut from bun 300; however, sheet 308 can be removed from bun 300 according to any desired method. In an advantageous embodiment, sheet 308 has a thickness of approximately 0.274 inches for F38 PVDF foam, and approximately 0.292 inches for F30 PVDF foam. However, sheet 308 can have any thickness that is appropriate for the intended use of the final duct product. The thicknesses of 0.274 inches and 0.292 inches are appropriate for the insulating ability specific to PVDF foam thermal properties and the thermal and moisture conditions in an aircraft to prevent moisture condensation on ducts. However, other thicknesses can be used to meet the needs of a duct product.

Figure 4:
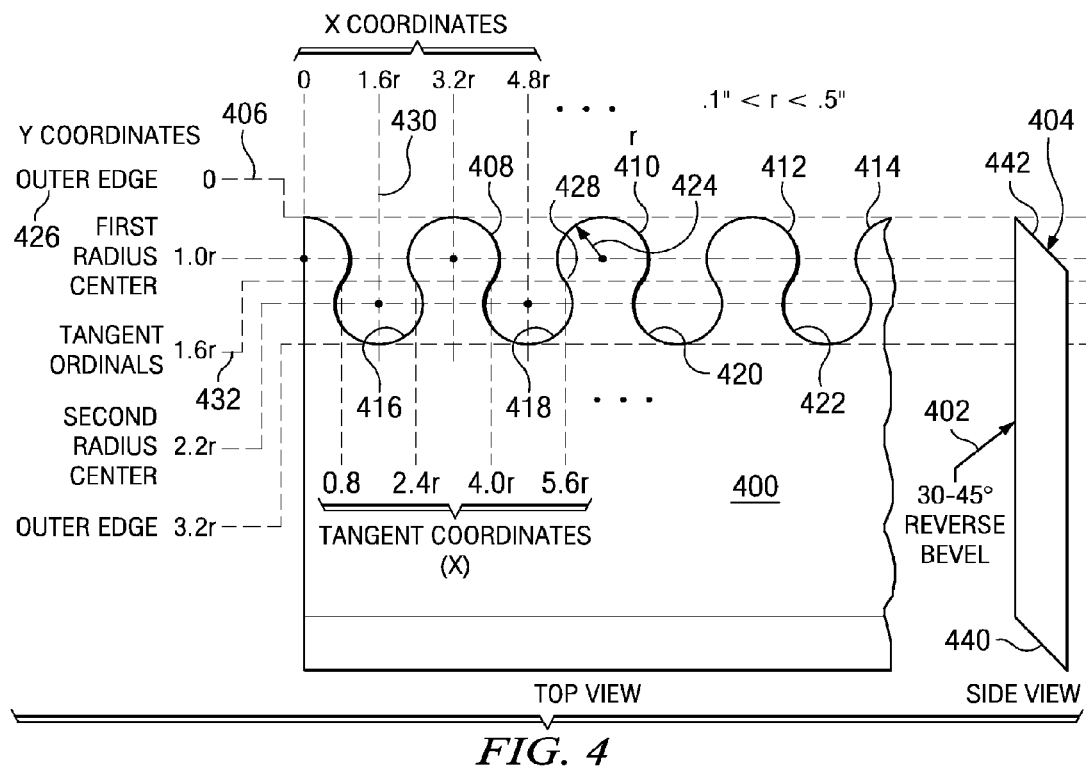
FIG. 4 shows the sheet of FIG. 3 after having been skived from the bun, wherein the sheet has been cut to have a beveled and crenulated shape on one edge and a beveled cut on the other edge, in accordance with an advantageous embodiment.

FIG. 4 shows the sheet of FIG. 3 after having been skived from the bun, wherein the sheet has been cut to have a beveled and crenulated shape on one edge and a beveled cut on the other edge, in accordance with an advantageous embodiment. In particular, FIG. 4 shows a top view and a side view of sheet 400 skived from bun 300 of FIG. 3 after having been cut to have the beveled and crenulated shape.

In particular, the edges of foam sheet 400 have been provided with reverse bevels, so that side 440 forms the inside of the duct and side 442 forms the outside of the duct. Additionally, the edges of foam sheet 400 have been provided with a crenulated edge. Thus, for example, as shown in side view of FIG. 4, bevel 402 is at an angle of about 30 to about 45 degrees, and bevel 404 is approximately parallel to bevel 402. Thus, foam sheet 400 is wrapped around a mandrel such that bevel 402, that also contains the crenulated edge, overlaps bevel 404.

Additionally, as shown in top edge 406, foam sheet 400 has been provided with a pattern of crenulation teeth, such as crenulation tooth 408, crenulation tooth 410, crenulation tooth 412, and crenulation tooth 414. In an advantageous embodiment, the opposite side of foam sheet 400, while beveled, forms a straight edge and is not crenulated. Thus, the crenulated edge is thermally embedded into solid foam, locking and sealing the seam upon formation of the duct. The determination of whether one or both edges are beveled and/or crenulated depends on a variety of factors. Thus, whether one or both edges of the foam sheet are beveled and/or crenulated varies for the application. A reverse bevel on one or both edges increases peel strength of one or both edges of the seam. Crenulation on one or both edges interlocks the Foam together by being thermally pressed into solid foam on one or both sides. If adhesively bonded or taped along the seam using an adhesive tape or thermal tape, the crenulation teeth can be similarly matched, sized, and dimensioned to fit within the alternating recesses in edge 406. Thus, for example, a crenulation tooth on the opposite edge of foam sheet 400 will fit into recess 416, and similarly, other crenulation teeth will fit into recesses 418, 420, and 422.

As shown in FIG. 4, the crenulation teeth and recesses are provided with particular dimensions so that the crenulations will interlock with each other or can be thermally embedded into solid foam once foam sheet 400 is wrapped around itself. In particular, a top end of a particular crenulation tooth, such as crenulation tooth 410 is provided with a radius "r", as shown by arrow 424. The entire length of crenulation tooth 410 from the bottom of any given recess, such as recess 418 or 420, is 3.2 times "r", in an advantageous embodiment. Thus, the tips of crenulation teeth 408, 410, 412, and 414 are beveled according to the angle shown in bevel 402, in the side view of FIG. 4. The tips of the crenulation teeth correspond to outer edge 426.

Additionally, the recesses in edge 406 of foam sheet 400 each have an enter radius corresponding to "r" as shown by arrows 428. The distance along the x coordinates as shown in FIG. 4, such as, for example, x coordinate phantom line 430 is equal to 1.6 times "r". Similarly, the distance between outer edge 426 and the tangent of the partial circle that forms the crenulation tooth and the partial circle that forms the recess is 1.6 times "r". The center of radii between a recess and a crenulation tooth along a Y-axis, such as the Y-axis of phantom line 432 is 1.2 times "r". In an advantageous embodiment, "r" is between about 0.1 inches and 0.5 inches. However, all of the values and relative values in this advantageous embodiment can be varied according to the final foam duct that is to be produced. In addition, the recesses can be made of a smaller relative radius in order to compress the interlocking crenulations. In use, foam sheet 400 is wrapped around a mandrel, such that bevel 402 abuts or overlaps bevel 404 and crenulation teeth 408, 410, 412, and 414 are pressed into solid foam or fit within the corresponding edge of foam sheet 400. The various numbers described above can be varied in other advantageous embodiments.

Figure 5:
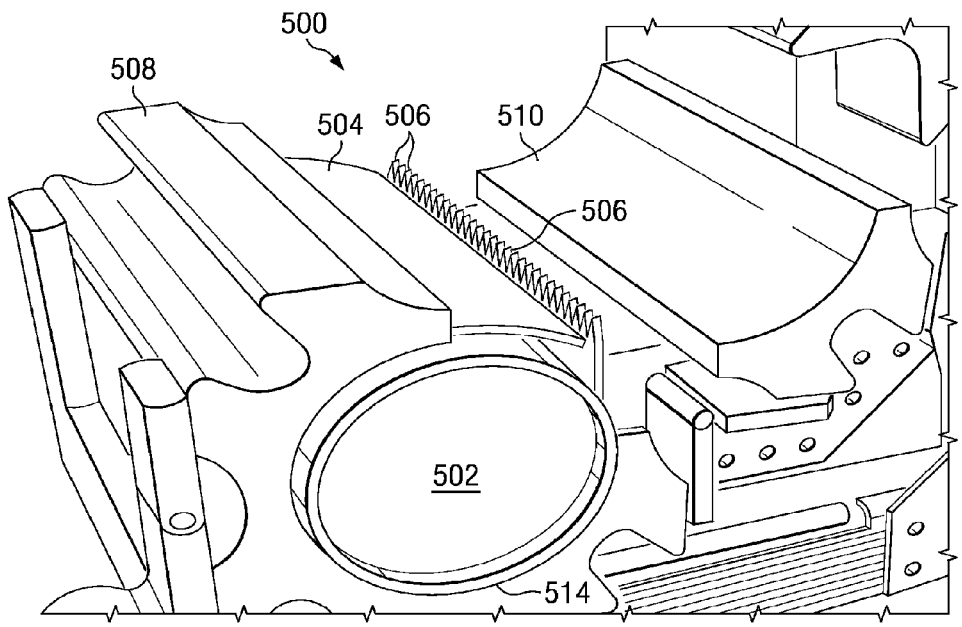
FIG. 5 shows an apparatus that uses heat and pressure to make the duct shown in FIG. 1 using a sheet of PVDF foam sheet that has been skived, beveled, and crenulated as shown in FIG. 3 and FIG. 4, in accordance with an advantageous embodiment.

FIG. 5 shows an apparatus that uses heat and pressure to make the duct shown in FIG. 1 using a sheet of PVDF foam sheet that has been skived, beveled, and crenulated as shown in FIG. 3 and FIG. 4, in accordance with an advantageous embodiment.

Apparatus 500 can be used to create a foam duct, such as foam duct 100 shown in FIG. 1, by overlapping and thermally bonding opposite edges of a foam sheet. In an advantageous embodiment, an overlap of 0.75 inches is created between beveled edge 402 and beveled edge 404 shown in FIG. 4. The foam sheet is then subjected to heat at about 300 degrees Fahrenheit for about ten minutes using approximately fifty percent compression. The term "fifty percent compression" means that both overlapped edges of the foam seam are compressed until the resulting seam that began at the thickness of two sheets is now the same thickness as one sheet.

Apparatus 500 includes mandrel 502 about which is wrapped foam sheet 504. As shown in FIG. 5, foam sheet 504 includes crenulation teeth 506 and corresponding recesses. Mandrel 502 is connected to an automated roller in order to rotate mandrel 502 about its central axis.

Mandrel 502 is disposed between bulkheads, in this case, bulkheads 508 and 510. Bulkheads are locked around mandrel 502 and foam sheet 504 during use. The overlapping edges of foam sheet 504 are heated and pressed between. Bulkhead 510 and mandrel 502 are used to produce the thermally bonded seam 602 of duct 600 shown in FIG. 6. Thereafter, the resulting duct is cooled. After a suitable cooling period, bulkheads 508 and 510 are opened and the resulting duct is released from the mandrel.

Apparatus 500 also includes one or more heating elements, not shown, in order to heat foam sheet 504 and the overlapping edges of foam sheet 504. In order to hold bulkheads 508 and 510 in place while compressing the foam seam from two ply thickness to one ply thickness, apparatus 500 also includes a locking mechanism, such as C-clamps, to keep the bulkheads in place while heat is applied to the seam of foam sheet 504.

Mandrel 502 is shown disposed in a trough. A spacer ring (not shown) wraps around mandrel 502 at a position towards the outer end of mandrel 502. The spacer assists in maintaining pressure on foam sheet 504 and also provides a mechanism for releasing the finished duct from the mandrel by using air pressure between the finished duct and mandrel 502.

The manufacturing process shown in FIG. 5 creates a continuous cylindrical duct without adding stiffness, deformation, or a seam that can be easily separated. The splicing design shown can also be fabricated using two other processes, a water jet process and a laser machining process. Both processes are fast, precise, and efficient.

Figure 6:
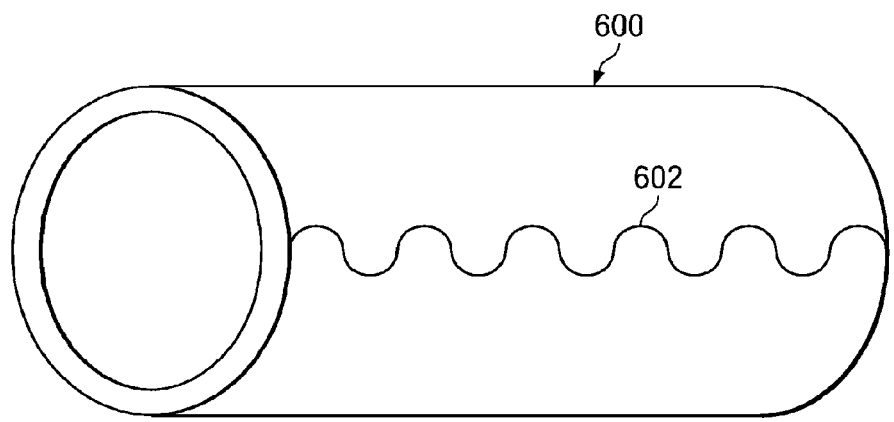
FIG. 6 shows the foam sheet shown in FIG. 4, wherein, after extraction from the apparatus shown in FIG. 5, the foam sheet has been formed into a duct with a crenulated-beveled seam, in accordance with an advantageous embodiment.

FIG. 6 shows the foam sheet shown in FIG. 4, wherein after extraction from the apparatus shown in FIG. 5, the foam sheet has been formed into a duct with a crenulated-beveled seam, in accordance with an advantageous embodiment. Foam duct 600 corresponds to foam duct 100 shown in FIG. 1, foam duct 200 shown in FIG. 2, and is the product of the process performed on foam sheet 504 shown in FIG. 5.

In particular, foam duct 600 shows crenulated seam 602 that is formed when beveled and crenulated edges are brought together. As shown in FIG. 6, a wavy line is formed along crenulated seam 602. Crenulated seam 602 is fused from the two edges of foam sheet 504 of FIG. 5. Thus, after the duct formation process shown in FIG. 5, duct 600 is a continuous cylindrical duct.

However, duct 600, as shown elsewhere herein, can be forced into many different shapes. Therefore, the circular or oval cross sectional shape of foam duct 600 is only an example of the ducts that can be formed by the process described elsewhere herein. Seam 602, as shown elsewhere herein, can be formed by other thermal and pressure processes as described, by adhesive bonding, or by adhesive of thermal taping.

Figure 7:
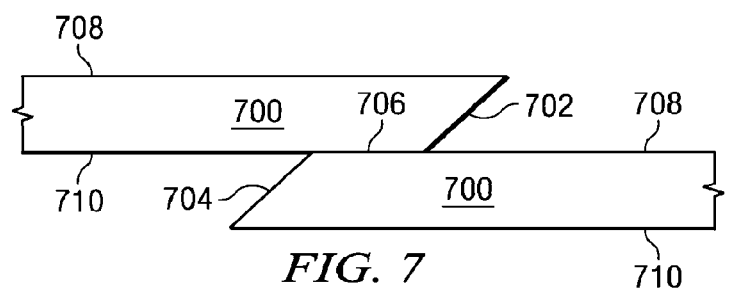
FIG. 7 shows a side view of two beveled edges of a foam sheet overlapped together during formation of a foam duct from the foam sheet, in accordance with an advantageous embodiment.

FIG. 7 shows a side view of two beveled edges of a foam sheet overlapped together during formation of a foam duct from the foam sheet, in accordance with an advantageous embodiment. Foam sheet 700 shown in FIG. 7 can be used to form a foam duct, such as foam duct 100 shown in FIG. 1, using apparatus 500 shown in FIG. 5. Foam duct 700 can be formed from bun 300 shown in FIG. 3. The configuration of foam sheet 700 shown in FIG. 7 is especially useful for the formation of foam ducts during a thermal fusion process.

Foam sheet 700 is formed into a right circular cylindrical duct; however, foam sheet 700 can be used with regards to any shaped duct. As shown in FIG. 7, beveled end 702 overlaps beveled end 704 in overlapping region 706. Beveled end 702 and beveled end 704 can have a straight or crenulated edge, such as those edges shown in FIG. 4, though neither beveling or crenulation is necessarily required depending on anticipated duct stresses, anticipated duct abuse, and the type of foam used.

In the advantageous embodiment shown in FIG. 7, surface 708 forms the outer surface of the duct and surface 710 forms the inner surface of the duct. As shown further with respect to FIG. 8, beveled end 702 and beveled end 704 are pressed into solid foam and heated in region 702, 704, and 706 to form a continuous seam of a duct, such as seam 602 shown in FIG. 6.

Figure 8:
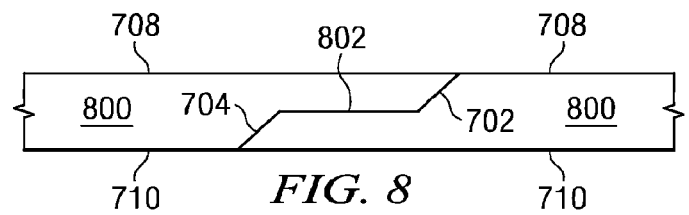
FIG. 8 is a side view of a foam duct seam formed by using heat and pressure at the seam according to the process described with respect to FIG. 7, in accordance with an advantageous embodiment.

FIG. 8 is a side view of a foam duct seam formed by using heat and pressure at the seam according to the process described with respect to FIG. 7, in accordance with an advantageous embodiment. Thus, foam duct 800 corresponds to foam duct 700 shown in FIG. 7.

As shown in FIG. 8, seam 802 is formed as beveled edge 702 and beveled edge 704 are pressed together. Thereafter, while beveled edge 702 and beveled edge 704 are pressed together, heat is applied and seam 802 is sealed. In this manner, a foam duct is formed.

Figure 9:
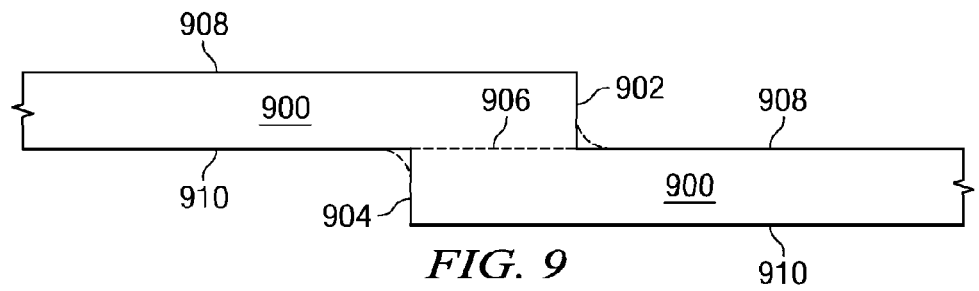
FIG. 9 is a side view of a foam duct seam having two edges that are adhesively bonded, in accordance with an advantageous embodiment.

FIG. 9 is a side view of a foam duct seam having two edges that are adhesively bonded, in accordance with an advantageous embodiment. Foam sheet 900 includes edge 902 and edge 904. Foam sheet 900 overlaps at seam 906 in the vicinity of edge 902 and edge 904. In an advantageous embodiment, an adhesive can be applied in the area of seam 906 to form a foam duct. Thus, the process shown in FIG. 9 can be used to repair ducts or can be used for alternative embodiments. Ultimately, foam sheet 900 will form a duct having outer face 908 and inner face 910.

FIG. 10 shows side view variants of foam duct seams formed with mitered edges of a foam sheet adhesively bonded together, in accordance with an advantageous embodiment. In particular, FIG. 10 shows a side view of a seam of foam duct 900 of FIG. 9. The two edges are then bonded together with adhesive that is applied along the seam. Thus, foam sheet 900 in FIG. 10 is formed into a duct having outer face 908 and inner face 910. The duct formed from foam sheet 900 can be a right circular cylinder duct, such as that shown in FIG. 1, but can also be any particular shape.

In an advantageous embodiment, flarings 1002 can be added to outer face 908 and inner face 910 of foam sheet 900 in order to stop seam breakage or localized fracture of foam cells that leads to dissolution due to abuse or pressure cycles. Flarings 1002 allow attachments, seams, and adhesive to flex together, versus pealing apart or inducing stress concentrations. In an advantageous embodiment, flarings 1002 are formed by applying adhesive over a seam such that the edges are thin. Flarings 1002 can also be formed by thinning the edges of stiff metal or composite attachments in a straight edge or crenulated edge. Flarings 1002 allow for the use of stronger adhesives that do not have the flexibility of normal foam adhesives.

FIGS. 11A and 11B show a side view of alternative seams formed by adhesively bonding the edges of a foam sheet together, in accordance with an advantageous embodiment. In particular, FIGS. 11A and 11B shows formation of an angled butt seam, in accordance with an advantageous embodiment, and FIGS. 11A and 11B shows formation of an overlapped butt seam, in accordance with an advantageous embodiment. As shown in FIGS. 11A and 11B, foam sheet 900 is the same as foam sheet 900 shown in FIG. 9.

In FIGS. 11A and 11B, foam sheet 900 has been pressed together in angle-butt seam 1100. End 902 and end 904 form a single line, as shown. If desired, flaring 1102 can be added. Flaring 1102 can be an adhesive to make the seam more durable once foam sheet 900 has been formed into a duct. Seam 1100 is perpendicular to outer face 908 and inner face 910.

The edges of the foam sheet shown in FIGS. 11A and 11B have been pressed together in overlapped-butt seam 1104. End 902 and end 904 form a single line, as shown. If desired, flaring 1102 can be added. Flaring 1102 can be an adhesive to make the seam more durable once foam sheet 900 has been formed into a duct. Overlapped-butt seam 1104 is shaped, as shown.

FIG. 12A through FIG. 12C show top views of geometric variants of the seams shown in FIG. 7 through FIGS. 11A and 11B, wherein the foam sheet has been formed into a duct, in accordance with an advantageous embodiment. FIG. 12A through FIG. 12C show three of many possible different seam patterns for foam ducts. In particular, FIG. 12A shows a simple seam pattern, in accordance with an advantageous embodiment. Simple seam pattern 1200 shows a straight seam that is also perpendicular to outer face 908, as shown with respect to FIG. 9.

FIG. 12B shows an interlocking foot pattern seam, in accordance with an advantageous embodiment. To form interlocking foot pattern seam 1202, the two edges of foam sheet 900 are each provided with a similar, but offset foot pattern. A saw-tooth in one edge will fit into a similar shaped recess of another edge of the foam sheet. Thus, interlocking foot pattern seam 1202 is similar to crenulated seam 602 shown in FIG. 6. Interlocking foot pattern seam 1202 is stronger and more durable than simple seam pattern 1200 shown in FIG. 12A.

FIG. 12C shows an interlocking crenulated seam, in accordance with an advantageous embodiment. Crenulated seam 1204 corresponds to crenulated seam 602 shown in FIG. 6. Crenulated seam 1204 is formed from the crenulated edges shown in FIG. 4. When thermally or adhesively bonded, the foam sheet becomes a duct, such as duct 600 shown in FIG. 6. Crenulated seam 1204 is stronger than simple seam pattern 1200 shown in FIG. 12A.

Figure 13:
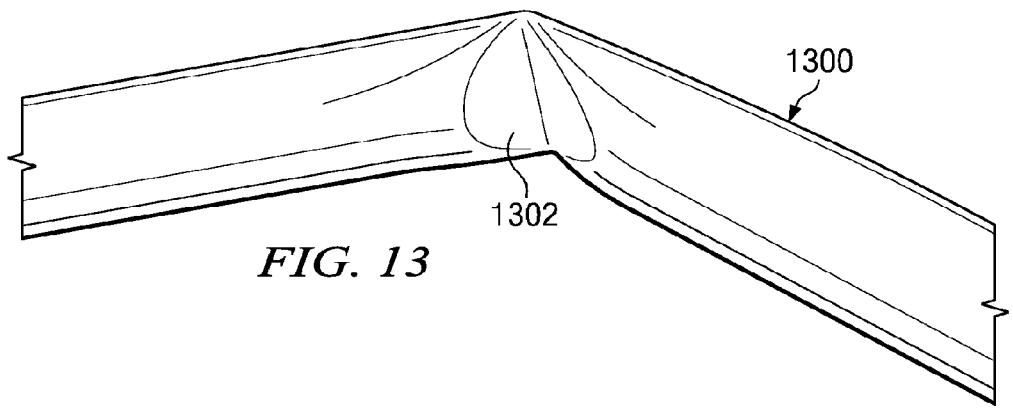
FIG. 13 shows a duct that has collapsed on bending.

FIG. 13 shows a duct that has collapsed on bending. When a foam duct is bent beyond a certain radius, the foam duct will buckle in one or more places, as shown in FIG. 13. Tube 1300 has kink 1302. Kink 1302 causes tube 1300 to be choked. Choking changes the intended duct shape and can prevent a duct from delivering conditioned air or other fluids. A prolonged choked condition can result in damage to subsequent systems in different aerospace vessel components. Loss of some systems could result in severe consequences, such as premature landing, loss of an airplane, an airplane being out-of-service, and passenger discomfort. All of these consequences can result to loss of profit for the airline carrier.

Figure 14:
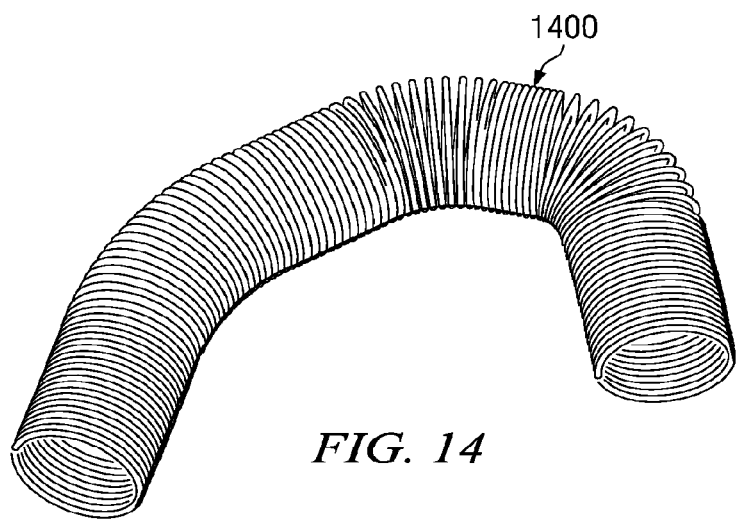
FIG. 14 shows a composite helical wire, in accordance with an advantageous embodiment.

FIG. 14 shows a composite helical wire, in accordance with an advantageous embodiment. Helical wire 1400 can be wrapped around a duct in order to improve the strength of a duct, particularly with respect to kinking or choking, as shown in FIG. 13. Helical wire 1400 is a thermoplastic wire formed into a helical shape using a heating process. However, any suitable wire can be applied to a duct to form a helical shape onto the duct.

Figure 15:
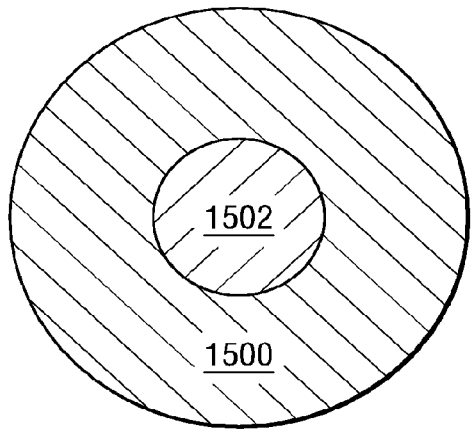
FIG. 15 shows a cross section of a composite helical wire for use in forming a helix on a foam duct, in an advantageous embodiment.

FIG. 15 shows a cross section of a composite helical wire for use in forming a helix on a foam duct, in an advantageous embodiment. Helical wire 1500 shown in FIG. 15 can be a wire, such as helical wire 1400 shown in FIG. 14. Helical wire 1500 includes a hollow area 1502, though hollow area 1502 is not necessarily required for every application. Additionally, the cross section of helical wire 1500 need not be round. The cross section of helical wire 1500 can be a partial circle, polygon, or other irregular shape, as desired for the particular application.

Helical wire 1500 can be formed from a variety of thermoplastic materials, such as, but not limited to polyetherimide, polyetheretherketone, polyphenylsulfone, and polyvinylidene fluoride (PVDF). Helical wire 1500 can also be made from other materials, such as PEI glass, PEEK glass, and various composite materials. These materials are chosen according to the properties that are desired for the final duct product.

In an advantageous embodiment, helical wire 1500 is formed from materials, such as polyetherimide or polyetheretherketone, which results in providing superior stiffness, strength, and bonding with less weight and cost. Helical wire 1500 is secured to a foam duct by thermal bonding, though adhesive bonding can also be used in other advantageous embodiments. Thermal bonding has the advantage that air pockets do not form at the edges between helical wire 1500 and a duct.

In advantageous embodiments, helical wire 1500 can be bonded to a foam duct, such as foam duct 100 shown in FIG. 1. Helical wire 1500 is a duct that forms a flex duct. Flex ducts are resistant to kinking. Helical wire 1500 can be bonded to a foam duct using a variety of means. In an advantageous embodiment, helical wire 1500 is thermally bonded to the duct in the same or similar manner that a seam is bonded together, as shown with respect to FIG. 4 through FIG. 12C. Other bonding means can also be used, such as, but not limited to glues or resins, or a combination of glues and thermal bonding.

Figure 16:
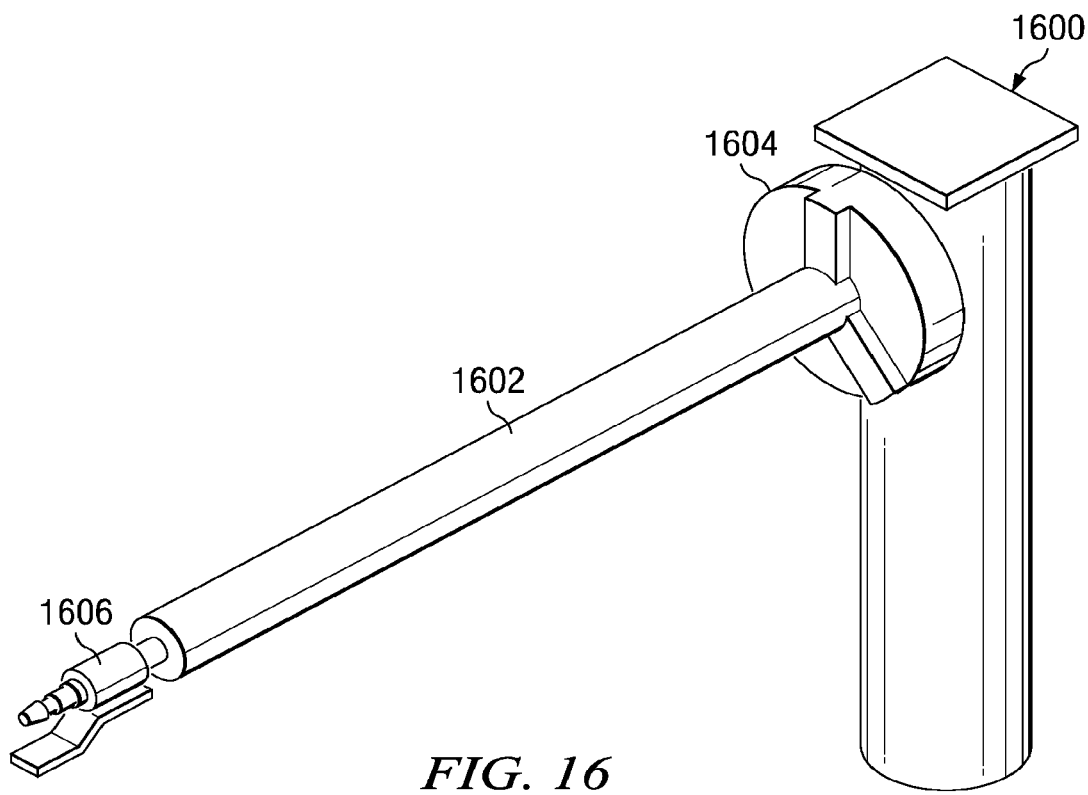
FIG. 16 shows a mandrel for forming a flex duct, in accordance with an advantageous embodiment.

FIG. 16 shows a mandrel for forming a flex duct, in accordance with an advantageous embodiment. FIG. 16 shows a device that can be used in conjunction with helical wire 1400 of FIG. 14 to form a flex duct.

In particular, apparatus 1600 includes mandrel 1602 and spindle 1604. In an advantageous embodiment, air nozzle attachment 1606 is provided in order to allow air from a hose to be forced into mandrel 1602. Thus, using a burst of air pressure, a foam duct on mandrel 1602 can be removed from mandrel 1602 easily and without breaking or tearing the duct. The same air can be used to help pleat the foam duct after the helix is formed.

In other advantageous embodiments, apparatus 1600 can be adjusted. For example, mandrel 1602 can be lengthened to accommodate different lengths of ducts. If mandrel 1602 is sufficiently long, then mandrel 1602 can be supported at the end opposite spindle 1604.

A design consideration for manufacturing ducts for use in airplanes is the desire to avoid creation of stresses within a duct. Many of these stresses can be avoided by avoiding embrittlement of a flex duct. In particular, embrittlement of the wire forming the helix of the flex duct is to be avoided.

Steps that can be taken to avoid embrittlement of the wire forming the helix include restricting the pulling of the extruded profile immediately after an exit cycle to retain the density of the wire. Additionally, the common practice of adjusting the profile shape of the wire is avoided after exiting the die. Furthermore, dies for the wire are developed to minimize undesired scoring and shaping of the wire. Additionally, caging of the initial fifteen feet of wire material can be performed to prevent sudden cooling shock and to minimize stress build up. Additionally, gradual and controlled cooling can be used to avoid absorption of residual stress. The factory temperature and humidity should also be controlled, and the use of regrind or recycled materials should be forbidden. In conventional duct making practices, use of regrind or recycled materials is common. However, such practice should be avoided when constructing ducts for use in aerospace vessels.

A process for relieving stress and for screening a helical coil is described below for the thermoplastic PEI. First, the extruded profile of a PEI coil is exposed to a temperature near a glass transition temperature for the thermoplastic. In an advantageous embodiment, such a temperature for PEI is in a range of about 380 degrees Fahrenheit to about 400 degrees Fahrenheit for approximately four or more hours. The extruded profile of the PEI coil is gradually cooled in an oven until the temperature is about 180 degrees Fahrenheit or less. The coil is then screened against a bright light, such as sunlight or a bright artificial light, to detect voids. The light creates a sharp glow in the duct, revealing flaws in the material. Flawed or defective material is rejected.

Another method to detect flaws is to apply a clean cloth wrap along the helical coil and moisten the cloth with MEK and Tricholoroathane. The cloth is kept moist so that fluid and vapor are in contact with the coil for about 25 to about 30 minutes. The solvent is sprayed frequently onto the cloth to replace evaporated solvent. The coil is then blot dried to avoid white filming and the part is examined for cracks. If the part exhibits cracks, then the part is discarded.

In the advantageous embodiment described above, helical or flex ducts are fabricated by attaching a wire over a preformed duct. However, an alternative process for forming helical ducts or flex ducts can also be used. This additional process is described below.

First, the mandrel is thoroughly cleaned with a lint-free wiper and solvent. The mandrel is positioned on a fabrication machine and the mandrel is wiped with the solvent using a lint-free wiper saturated with the solvent. The mandrel is then wiped dry with the lint-free wiper. Next, TEFLON® (polytetrafluoroethylene), a suitable release tape, or some other release agent is applied to the mandrel. A PVDF foam sheet is then turned to the desired size using the formula described above in order to ensure adequate material for the type of splice. A thin, transparent adhesive tape can be incorporated to enhance the adhesion strength of the splice. The foam sheet is positioned and rolled on the mandrel, and secured approximately every four to eight inches with PVA tape.

The foam duct body is heated at about 180 degrees for about twenty minutes to build a shape memory in the foam duct. The next step is to pressure wrap the foam overlaps at the center of the duct and work towards the ends. This technique ensures uniformity of splice overlap along the full length of the duct. The PVA tape wrap pressure is kept firm throughout the overall length of the foam by slightly compressing the foam.

Next, an extra ply of foam is applied to the cuff areas, if required by the design. A reinforcing ply layer may be added to enhance tear resistance and to aid in installation of a clamp during installation in an aerospace vessel.

Next, the cuff areas are pressure wrapped with a PVA sheet or tape. The overlap areas are thermally fused or welded at 300 degrees Fahrenheit plus or minus about 10 degrees for about 12 to about 15 minutes.

Next, a helix size and shape is selected based on the desired performance. Polyetherimide helixes can be used to meet aviation requirements. Next, a small piece of thermal-setting fiberglass tape is placed at the initiation of the wire to protect the foam interface from abrasion damage. The wire is applied using a pitch bar in order to apply uniform spacing of a desired helical pitch while the mandrel is rotating. The pitch bar helps ensure that the helix is free of twists and that the wire is cleaned as the wire is fed. The pitch bar also controls the pitch of the helix.

Next, fiberglass tape is applied to the underside of the termination of the helix to protect the foam. The terminated ends are secured by applying a full rotational wrap.

Next, a mixture of HYSOL U-10FL and acetone at a ratio of two parts adhesive to one part acetone by volume is prepared. The mixture is applied over the helix at an ambient temperature of about 50 degrees Fahrenheit to about 80 degrees Fahrenheit. Finally, the assembly is force cured at 200 degrees Fahrenheit for about 45 to about 60 minutes.

Figure 17:
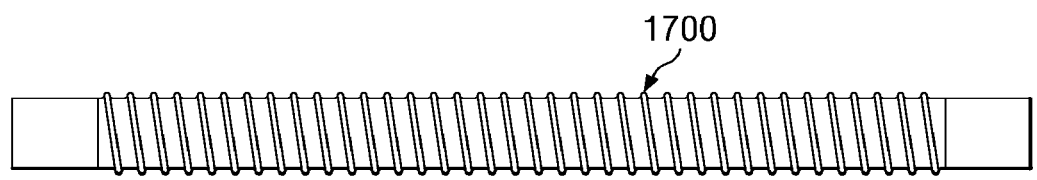
FIG. 17 shows a flex duct formed using the apparatus shown in FIG. 16, in accordance with an advantageous embodiment.

FIG. 17 shows a flex duct formed using the apparatus shown in FIG. 16, in accordance with an advantageous embodiment. If pleated, duct 1700 can be referred to as an accordion duct because duct 1700 can be compressed or expanded along its length.

During airplane assembly, often the last duct in the final assembly is either too long or too short. However, this problem can be addressed using a flex duct as shown in FIG. 17. Thus, using duct 1700, custom duct fitting, readjustment, or realignment of an entire environmental control system duct assembly can be avoided. Additionally, special tools and parts do not need to be created in order to finish connecting an environmental control system in an aerospace vessel.

Duct 1700 is also useful in areas where the degree of flexion is to be minimized in order to decrease noise generated from bending airflow around corners. Using a single helix that is heat molded to the duct, a specific degree of flexibility can be achieved for the helical flex duct. For example, for a sidewall riser duct of an aerospace vessel, the initial turns can be flexible. However, as the turn comes closer to the passenger deck, the flex section of the duct can be made less flexible and quieter. In an advantageous embodiment, PVDF foam ducts can usually bend, without collapse, to the radius of a large fuselage without the use of a helix wire.

FIG. 18 is a table relating helix and helical pitch relationships to diameters of ducts, in accordance with an advantageous embodiment. Table 1800 can be used to select a diameter of a wire wrapped around a duct and to select a corresponding pitch of the helix, as the wire used to make the helix is wrapped around a duct. Generally, as the hose or duct diameter increases, the diameter and pitch of the wire also increase as shown. For a polyetherimide wire, the wire properties do not significantly vary between whether or not the wire is hollow or solid. Whether the wire is hollow or solid also does not significantly affect the pitch of the helix. However, hollow wires are lighter and are more flexible, whereas solid wires are stiffer and provide greater protection against duct choking.

FIG. 19 is a table showing numbers of helix revolutions to achieve various duct bend angles, in accordance with an advantageous embodiment. Table 1900 can be used to determine the amount of wire needed when wrapping a helix around a duct. In particular, table 1900 can be used to determine the amount of wire needed when wrapping a wire around a duct that has a cross-section of a circle or near circle. The amount of wire depends on bends in the duct. Depending on the nominal bend angle and the maximum bend angle, a minimum number of helix revolutions are used. Given the number of helix revolutions needed and given the radius of the duct, the amount of wire needed can be determined.

Figure 20:
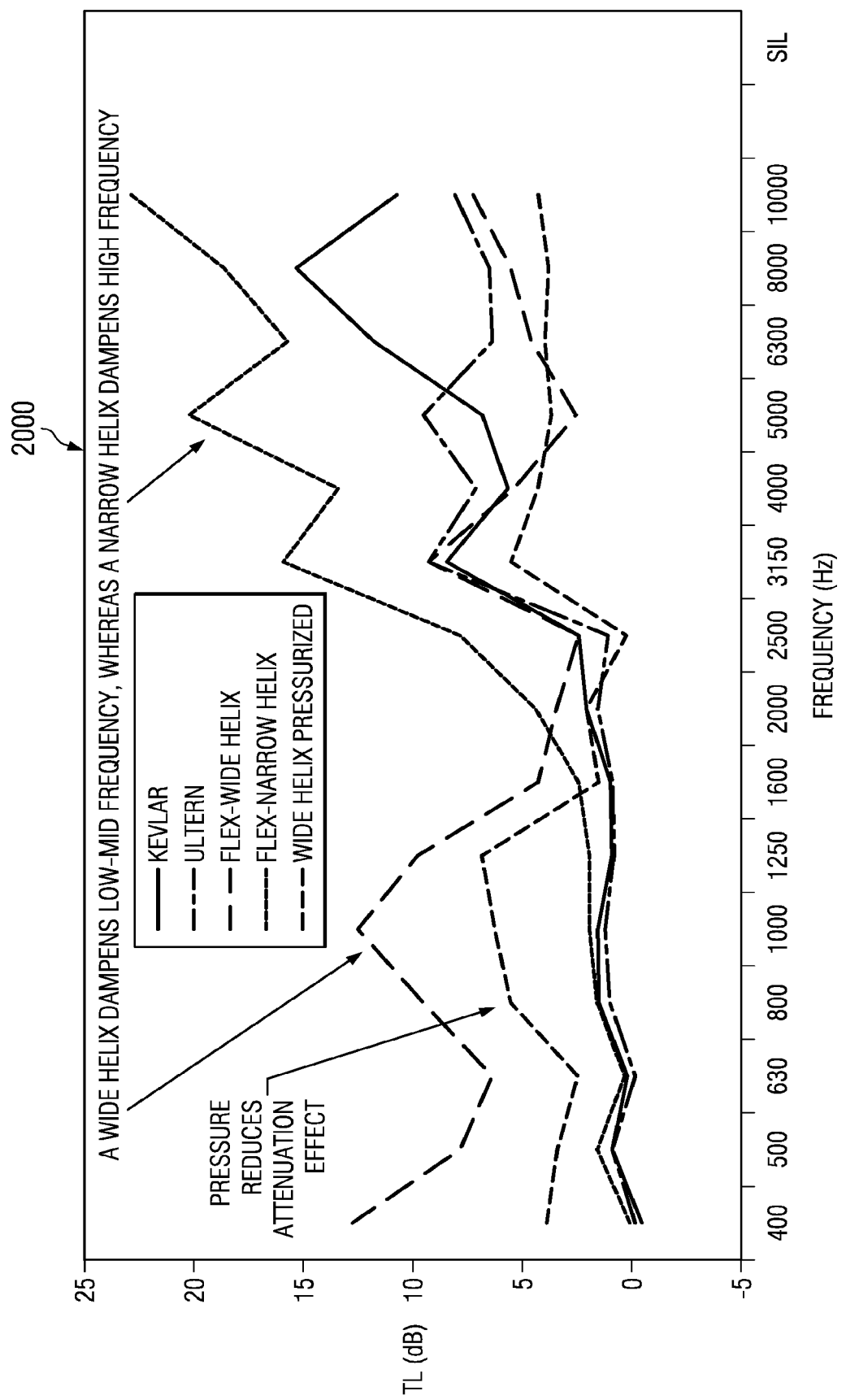
FIG. 20 is a table showing transmission noise reduction versus frequency of sound based on duct construction, in accordance with an advantageous embodiment.

FIG. 20 is a table showing transmission noise reduction versus frequency of sound based on duct construction, in accordance with an advantageous embodiment. Table 2000 shows that the pitch of the helix wrapped around a foam duct changes the noise dampening effects of the duct. Noise dampening is of great concern in aerospace vessel construction due to the noise created when the airplane is operational.

As shown in table 2000, the best noise attenuation is achieved depending on both the width of the helix pitch and the frequency of noise that is to be attenuated. For example, in the frequency range of approximately 1000 hertz, a wide helical pitch produces the best noise attenuation. However, at about 7000 hertz, a narrow helical pitch provides the best noise dampening. Thus, depending upon the particular use to which a duct is to be put, and depending on the noise frequency expected from fluid flowing through the duct, the helical pitch can be adjusted to maximize frequency attenuation.

Additionally, thermoplastic foams, such as PVDF foams, exhibit superior acoustic dampening properties compared with traditional metal or plastic ducts. Thus, in conjunction with selected helical pitches, thermoplastic foam ducts can substantially decrease the noise volume emitted from ducts during airflow through a duct. In an advantageous embodiment, a decrease of 2.5 decibels per duct foot can be achieved. Higher or lower decibel attenuations can also be achieved. A foam duct can also be wrapped in a thin composite layer to provide the same breakout noise attenuation found in composite ducts. Further, the frequency of noise attenuation can be tuned by changing the helix pitch along the length of the duct.

In an advantageous example, before air is sent from the lower lobe of an aerospace vessel to the upper lobe, engineers want the ducts to have high flow noise attenuation because the risers taking the air into the upper lobe are in the side walls next to the ears of passengers. Thus, for this application, untreated foam is used in the lower lobe to attenuate noise flow generated from fans and bending the air up the side wall of the aerospace vessel. Then, a helix, thin composite layer, tape, or a combination of these can be used around the duct close to where a passenger ear is located in order to attenuate breakout noise. Thus, a duct can be provided with a partial helix, in the sense that the helix does not extend the entire length of the duct.

Additionally, noise attenuation characteristics of foam ducts are dependent on helical angle as well as helical pitch. A wide helix angle dampens low to mid frequency noise, whereas a narrow helix angle dampens high frequency noise. Therefore, duct noise attenuation at a desired frequency regime can be obtained by varying helical characteristics, such as angle and pitch. The dampening of low to mid frequency is very significant, as low frequency noise reductions are more difficult to attenuate. Conventional techniques for attenuating low frequency noise are generally achieved by adding significant undesirable weight to the aerospace vessel.

Figure 21:
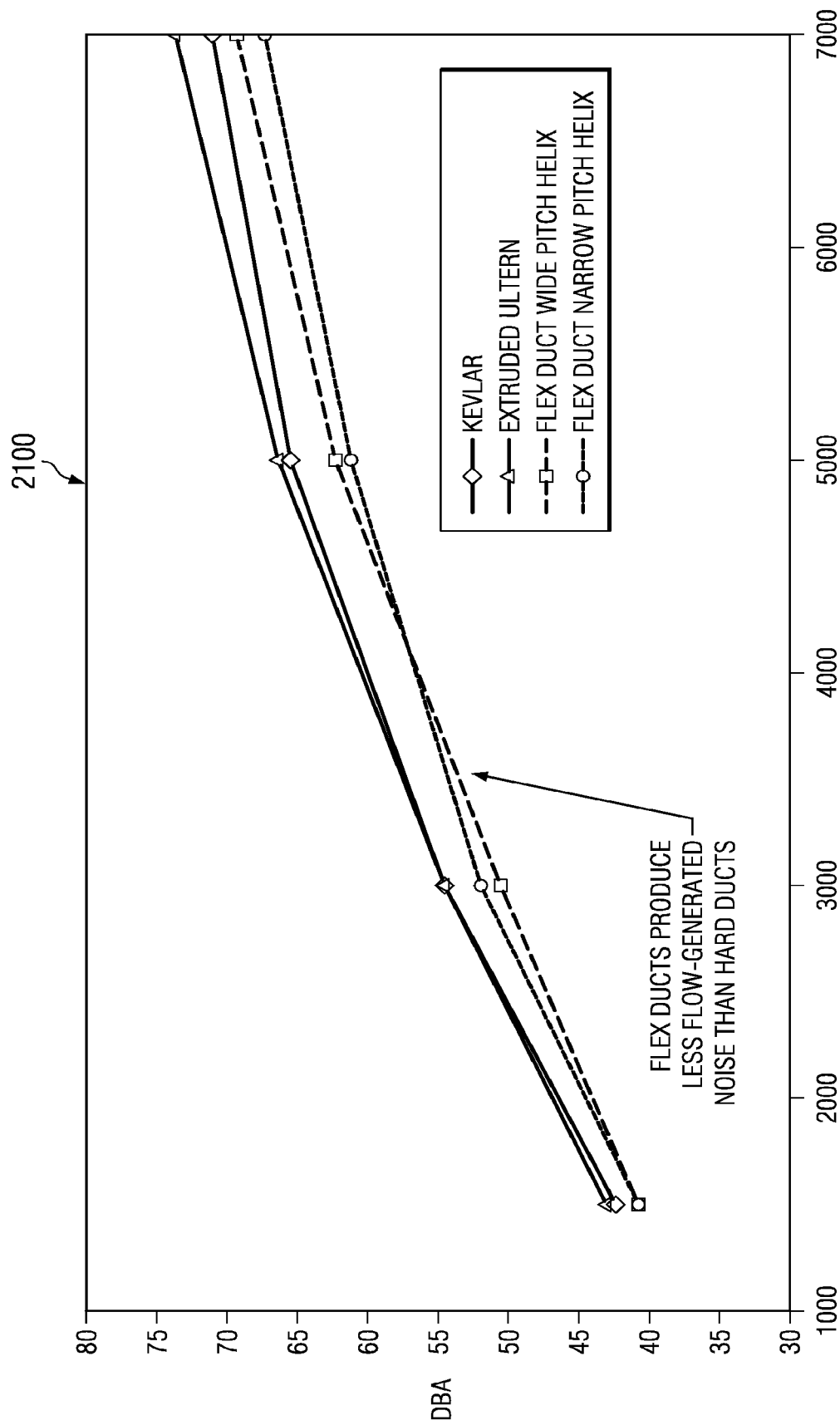
FIG. 21 is a table showing transmission noise advantages of thermoplastic foam ducts versus conventional ducts relative to airplane flow for a duct, in accordance with an advantageous embodiment.

FIG. 21 is a table showing transmission noise advantages of thermoplastic foam ducts versus conventional ducts relative to airflow thru a duct, in accordance with an advantageous embodiment. Table 2100 shows that the noise in a duct depends on the flow rate in feet per minute of fluid, such as air, through the duct. As shown in table 2100, foam ducts produce less flow-generated noise than hard ducts. Thus, again, in conjunction with table 2000 of FIG. 20, foam ducts have been shown to have superior noise attenuation qualities.

Figure 22:
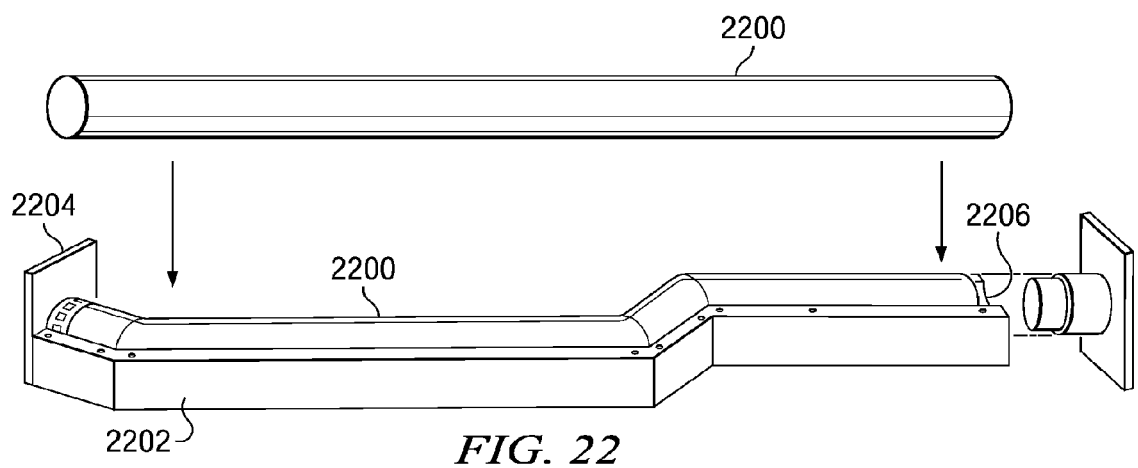
FIG. 22 shows a cylindrical foam duct being molded into a complex shape, in accordance with an advantageous embodiment.

FIG. 22 shows a cylindrical foam duct being molded into a complex shape, in accordance with an advantageous embodiment. Foam duct 2200 can be foam duct 100 shown in FIG. 1 and FIG. 2, or foam duct 600 shown in FIG. 6. Similarly, foam duct 2200 could also be foam duct 1700 shown in FIG. 7.

As shown in FIG. 22, foam duct 2200 is placed into the bottom half of mold 2202. The ends are plugged with end-caps 2204 and 2206 and then the top half of mold 2202 is secured over foam duct 2200. Mold 2202 has the desired shape of the final foam duct product. In an advantageous embodiment, foam duct 2200 is pressurized by blowing air in one or more ends, such as end-cap 2206.

After internal pressurization to what will be two or more atmospheres at final temperature, depending on the need for shape change and geometric definition of the part, foam duct 2200 is heated to a temperature near or above the glass transition temperature of the thermoplastic. For PVDF foam, the filled apparatus is heated to about 300 to about 400 degrees Fahrenheit for a time of about 5 to about 20 minutes. Thereafter, foam duct 2200 is cooled and then depressurized. Foam duct 2200 is then removed from mold 2202 and is ready for use or for further processing.

Thus, the advantageous embodiment shown in FIG. 22 can be used to transform straight or cylindrical foam ducts into ducts having complex shapes. In particular, foam duct 2200 can assume a shape having sharp changes in direction, necking, or other complex shapes. Additionally, if the size of mold 2202 is somewhat larger than foam duct 2200, then the size of foam duct 2200 can be increased by the process described above.

In another advantageous embodiment, one or more additional molds can be used to increase or slightly decrease the diameter of foam duct 2200. For example, an additional mold can be inserted into foam duct 2200, wherein the additional mold has a diameter slightly larger than the diameter of foam duct 2200. Thus, during processing the diameter of foam duct 2200 can be increased in size.

Figure 23:
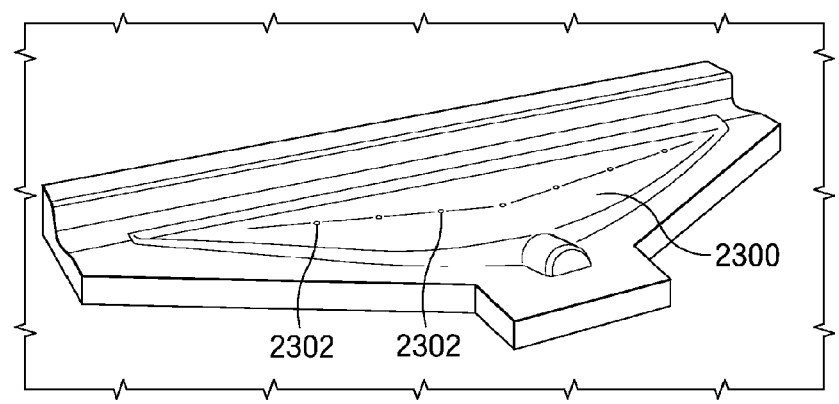
FIG. 23 illustrates a vacuum form tool, in accordance with an advantageous embodiment.
Figure 24:
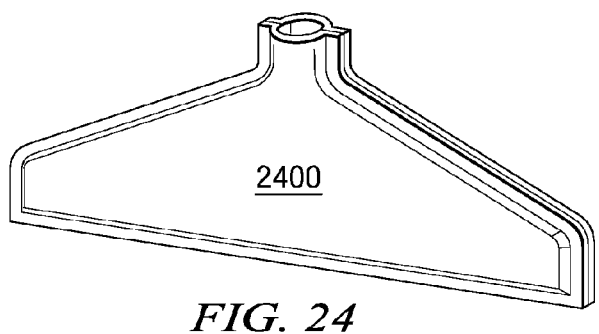
FIG. 24 shows two halves of a vacuum-formed foam sheet thermally or adhesively bonded together, in an advantageous embodiment.

FIG. 23 and FIG. 24 illustrate a process for forming a duct having a complex shape. In particular, FIG. 23 and FIG. 24 illustrate a process of foaming a duct through the use of a vacuum formation process.

FIG. 23 illustrates a vacuum form tool, in accordance with an advantageous embodiment. Vacuum form tool 2300 is in a shape corresponding to a desired shape for the final foam duct product. Vacuum form tool 2300 is provided with a number of small holes or apertures, such as apertures 2302. In an advantageous embodiment, a foam sheet, such as foam sheet 302 shown in FIG. 3, is placed over vacuum form tool 2300. Air is drawn out through apertures 2302 as heat is applied, thereby creating a vacuum suction that draws the softened foam sheet close over vacuum form tool 2300. Heat is applied near glass transition temperature to the foam sheet for a specified period of time. In an advantageous embodiment the PVDF foam sheet is held under about 1 atmosphere of vacuum pressure at 300 degrees Fahrenheit for about 10 minutes. Thereafter, the foam sheet is cooled and removed from vacuum form tool 2300.

FIG. 24 shows two halves of a vacuum-formed foam sheet thermally or adhesively bonded together, in an advantageous embodiment. Duct 2400 is made from two foam sheets molded using vacuum form tool 2300 in FIG. 23 and a similar vacuum form tool not shown. After individually forming each sheet using vacuum form tool 2300 in FIG. 23, the two sheets are bonded together using thermal bonding or adhesive bonding, as described previously herein. As a result, duct 2400 is created. As can be seen, duct 2400 has an unusual shape.

In an advantageous embodiment, individual molded pieces of foam can be adhesively fixed to each other using an adhesive, such as BAC5010 type 70, as shown in FIG. 9 through FIGS. 11A and 11B, or thermally bonded as described with respect to FIG. 4 through FIG. 8. Adhesive BAC5010 type 70 is known to meet flammability and strength requirements, as set forth by the Federal Aviation Administration. In an advantageous embodiment, the application of an adhesive avoids thick layers or buildup and avoids non-flexible stress points that can cause foam fracture. Additionally, ducts can be joined to each other using cuffs or sleeves.

In another advantageous embodiment, two halves of a molded sheet are pressed together to form a duct around a tool, such as a mandrel. By forcing the molded sheets together around the tool, the two halves of the foam sheet can be pressed into a shape representing the final shape of the finished foam duct.

In an advantageous embodiment, two C-shaped hotplates are placed around the tool. The ends of the duct are placed against the C-shaped hotplates. The C-shaped hotplates are simultaneously heated to bring the ends of the PVDF foam ducts to about 300 degrees Fahrenheit. The C-shaped hotplates are held together for approximately 20 seconds under gentle pressure. Then, the C-shaped hotplates are quickly re-tracked and the ends forced together. In an advantageous embodiment, thermally active tape or pressure sensitive tape may be wrapped around a joint or foam duct as added reinforcement for protection of the foam duct.

Figure 25:
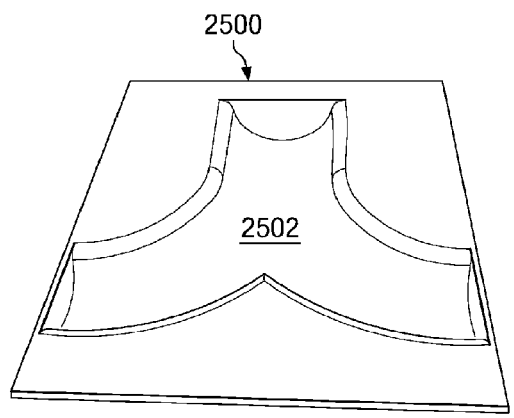
FIG. 25 shows half of a female mold for use during press formation of a duct, in accordance with an advantageous embodiment.
Figure 26:
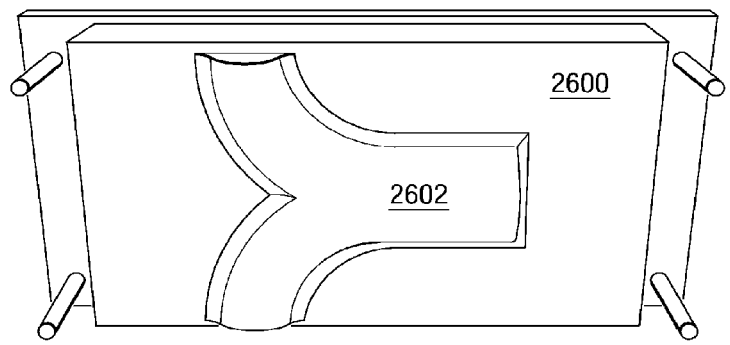
FIG. 26 shows half of a male mold used during press formation of a duct, in accordance with an advantageous embodiment.
Figure 27:
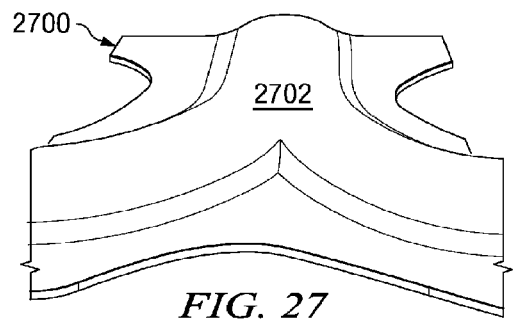
FIG. 27 shows a molded foam sheet that, when bonded to a complimentary molded foam sheet, forms a foam duct, in accordance with an advantageous embodiment.

FIG. 25 shows a female mold for use during press formation of a duct, in accordance with an advantageous embodiment. FIG. 26 shows the male mold used during press formation of a duct, in accordance with an advantageous embodiment. FIG. 27 shows a molded foam sheet that, when bonded to a complimentary molded foam sheet, forms a foam duct, in accordance with an advantageous embodiment. FIG. 25 through FIG. 27 together illustrate a press mold and a process which can be used to form a component of a foam duct or to form a whole foam duct, particularly for foam ducts having non-cylindrical shapes or a curved axis.

In particular, foam sheet 2700 in a flat state is placed between female mold 2500 of FIG. 25 and male mold 2600 of FIG. 26. Male mold 2600 includes bulge 2602 having a desired shape for one side of the final foam duct product. Female mold 2500 includes depression 2502 that has the shape for the other side of the final foam duct. Female mold 2500 is approximately offset from bulge 2602 when pressed together, with the offset being about the thickness of foam sheet 2700. Foam sheet 2700 is then heated to near glass transition temperature. In an advantageous embodiment, PVDF foam is heated to approximately 300 degrees Fahrenheit for about 20 seconds and then placed between female mold 2500 and male mold 2600 when the molds are completely separated. The molds are then quickly pressed together in proximity to each other to about the approximate thickness of foam sheet 2700.

The pressure applied to foam sheet 2700 during the heating process can vary depending on the foam and need for geometric definition. In an advantageous embodiment, a pressure of about 5 pounds per square inch is applied, and a heat of about 300 degrees Fahrenheit is applied for about 10 minutes.

Thereafter, the molds are allowed to cool, female mold 2500 and male mold 2600 are separated and foam sheet 2700 is removed. Foam sheet 2700 has assumed a shape of the mold, as shown by shape 2702. Foam sheet 2700 can then be bonded to one or more additional foam sheets to form a foam duct or some other component. In another advantageous embodiment, foam sheet 2700 can be attached to other components, such as plastic ducts or other parts or metal ducts or other parts.

Figure 28:
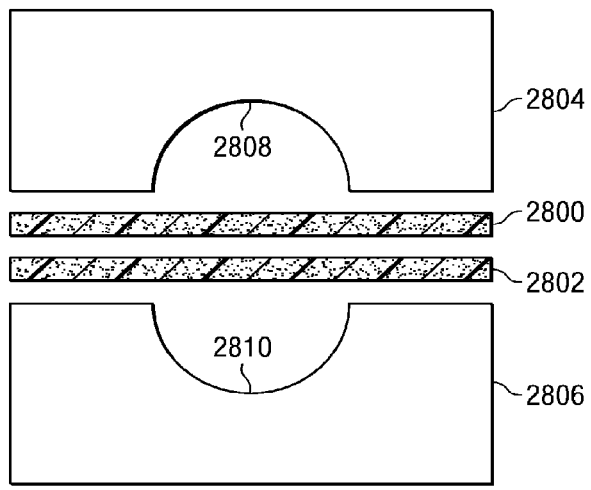
FIG. 28 shows two thermoplastic foam sheets disposed between molds, in accordance with an advantageous embodiment.
Figure 29:
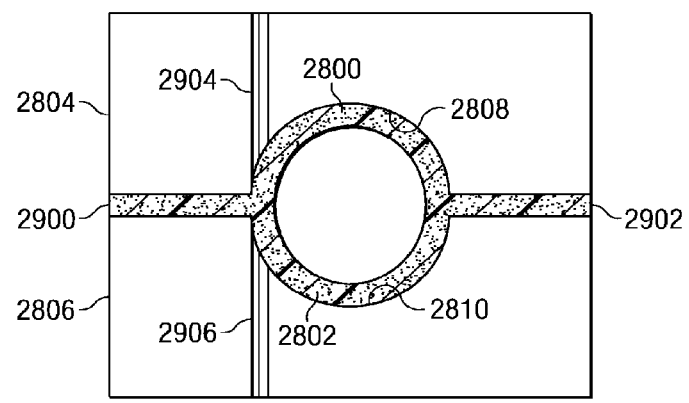
FIG. 29 shows a duct being formed using the mold and thermoplastic sheets shown in FIG. 28, in accordance with an advantageous embodiment.
Figure 30:
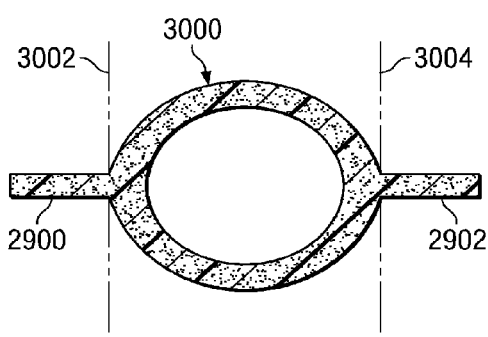
FIG. 30 shows a duct manufactured according to the devices shown in FIG. 28 and FIG. 29, in accordance with an advantageous embodiment.

FIG. 28 through FIG. 30 show a method of making a duct. In particular, the method shown in FIG. 28 through FIG. 30 can be used to create a foam duct, such as foam duct 100 shown in FIG. 1.

In particular, FIG. 28 shows two heated thermoplastic foam sheets disposed between molds, in accordance with an advantageous embodiment. The process begins by placing a first foam sheet, such as foam sheet 2800, and a second foam sheet, such as foam sheet 2802, between upper mold block 2804 and lower mold block 2806. Upper mold block 2804 includes depression 2808, into which foam sheet 2800 will be forced. Lower mold block 2806 contains depression 2810 into which foam sheet 2802 will be forced. Foam sheet 2800 and foam sheet 2802 can be made of PVDF F30 or F38 foam; however, foam sheet 2800 and foam sheet 2802 could be made of any foam suitable for use in the targeted environmental control system.

FIG. 29 shows a duct being formed using the mold and thermoplastic sheets shown in FIG. 28, in accordance with an advantageous embodiment. FIG. 29 shows that upper mold block 2804 and lower mold block 2806 have been pressed together, such that foam sheet 2800 and foam sheet 2802 shown in FIG. 28 have been pressed together in flange region 2900 and flange region 2902. In an advantageous embodiment, air is forced between foam sheet 2800 and foam sheet 2802, such that foam sheet 2800 is forced into depression 2808 and foam sheet 2802 is forced into depression 2810.

Optionally, in another advantageous embodiment, holes 2904 and 2906 can be provided in mold blocks 2804 and 2806, such that a vacuum or negative pressure can be applied through mold blocks 2804 and 2806. In an advantageous embodiment, holes 2904 and 2906 are between about ⅛" in diameter and about ⅙" in diameter, but the hole sizes can be either larger or smaller. The vacuum or negative pressure can be applied to force foam sheet 2800 into depression 2808 and foam sheet 2802 into depression 2810.

Before and while foam sheet 2800 and foam sheet 2802 are forced into the configuration shown in FIG. 29, heat is applied to foam sheet 2800 and foam sheet 2802, including flange region 2900 and flange region 2902. In an advantageous embodiment, upper mold block 2804 and lower mold block 2806 are brought together while foam sheet 2800 and foam sheet 2802 are hot. In this manner, foam sheet 2800 and foam sheet 2802 are fused together at flange regions 2900 and 2902. This process can be used to form a duct or ducts having any particular shape. In an advantageous embodiment, a foam duct in the shape of a tube is formed.

In an advantageous embodiment, foam sheet 2800 and foam sheet 2802 are heated at about 300 degrees Fahrenheit, at about 1 atmosphere of pressure with an internal part pressure of approximately 25 PSI (pounds per square inch). The pressure applied between upper mold block 2804 and lower mold block 2806, in an advantageous embodiment, should be sufficient to achieve about a 50% seam compression in flange region 2900 and flange region 2902. In an advantageous embodiment, pressure should be applied with heat for approximately thirty to forty seconds. Different times, temperatures, and pressures can also be used.

FIG. 30 shows a duct manufactured according to the devices shown in FIG. 28 and FIG. 29, in accordance with an advantageous embodiment. FIG. 30 shows foam duct 3000 with flange regions 2900 and 2902. Foam duct 3000 corresponds to a fusion between foam sheet 2800 and foam sheet 2802 in FIG. 28 and FIG. 29.

After fusing foam sheet 2800 and foam sheet 2802 as shown in FIG. 29, foam duct 3000 is allowed to cool. Upper mold block 2804 and lower mold block 2806 are separated from foam duct 3000. In an advantageous embodiment, upper mold block 2804 and lower mold block 2806 can be separated from foam duct 3000 while foam duct 3000 is below glass transition temperature. In another advantageous embodiment, flange region 2900 and flange region 2902 can be trimmed from foam duct 3000, as shown by phantom line 3002. Similarly, flange region 2902 can be trimmed from foam duct 3000, as shown by phantom line 3004. In another advantageous embodiment, one or both of flange area 2900 and flange area 2902 can be left on foam duct 3000, or partially trimmed, in order to accommodate a particular part to be manufactured.

FIG. 31 illustrates joining of conventional ducts for an aerospace vessel environmental control system using a joining system, in accordance with an advantageous embodiment. Silicone sleeve 3100 is slid over the ends of duct 3102 and duct 3104. Beads 3106 disposed around ducts 3102 and 3104 help secure ducts 3102 and 3104 to the sleeves and then the sleeves to other ducts. Silicone sleeve 3100 is disposed over beads 3108. Beads 3106 and 3108 are typically shaped like a ring, thin on the edges, thick in the middle, and wrap around the duct end. Additionally, clamps 3110 and 3112 are used to further secure silicone sleeve 3100 to ducts 3102 and 3104. Clamps 3110 and 3112 can be traditional metal clamps or plastic clamps. Beads can add significant weight, manufacturing costs, and difficulty. Clamps, especially metal clamps, also add significant weight.

FIG. 32 shows two ducts joined by a foam sleeve, in accordance with an advantageous embodiment. Foam sleeve 3200 is a fraction of the weight of a silicone sleeve and eliminates half of the beads and clamps. Foam sleeve 3200 is made an integral part of duct 3202 by thermal welding or adhesive bonding, using similar techniques described above. In the advantageous embodiment of FIG. 32, foam sleeve 3200 is made of the same foam material as duct 3202, though foam sleeve 3200 can be made from a different thermoplastic material.

Sleeve end 3204 extends over duct 3206, which adjoins duct 3202. Bead 3208 on duct 3206 aids in securing sleeve end 3204 to duct 3206. Though often not needed, clamp 3210 can be secured around sleeve end 3204 in order to more securely attach sleeve 3204 to duct 3206. Even if clamp 3210 is required for a particular product, no clamp is needed for the one end of duct 3202.

Thus, at a minimum, at least half of the clamps in an environmental control system of an aerospace vessel can be avoided, relative to previously known systems for attaching ducts to the environmental control system of an aerospace vessel. This avoidance advantageously decreases the weight of the airplane and reduces the cost of manufacturing the airplane. Furthermore, foam is self-insulating. Therefore, for many applications in the environmental control system of an aerospace vessel, additional insulation is not needed. Accordingly, additional weight can be saved.

Overall, approximately 100 pounds of weight can be removed from the environmental control system of a 250 passenger aerospace vessel. Thus, the value of the plane increases by many thousands of dollars and the cost of producing the plane is decreased due to the use of less expensive materials and manufacturing techniques associated with the advantageous embodiments described herein.

Note that second sleeve 3212 is thermally or adhesively bonded to duct 3206. Thus, a third duct can be attached to duct 3206 in the same or similar manner that duct 3206 is attached to duct 3202.

With respect to both advantageous embodiments shown in FIG. 32, a wire can be wrapped around foam sleeve 3200 in a helical pattern. The resulting helix can reduce noise from airflow through duct 3202 and duct 3206. Additionally, the wire helix can increase a structural strength of foam sleeve 3200.

In another advantageous embodiment, a cloth can be placed around foam sleeve 3200. The cloth acts to stiffen the area around foam sleeve 3200. In another advantageous embodiment, the cloth can be replaced with an open weaved carrier, such as TEDLAR® (polyvinyl fluoride), polyester, fiberglass, or other suitable fabric. Such materials provide resistance to tearing and ballooning at higher pressures. Other materials, such as a Nextel fabric, can be used to protect the foam sleeve from high temperatures.

FIG. 33 shows a method of joining foam ducts using integral foam sleeves and composite cuffs, in accordance with an advantageous embodiment. The method shown in FIG. 33 is another advantageous embodiment for joining ducts, relative to the methods shown in FIG. 31 and FIG. 32.

FIG. 33 shows foam duct 3300 disposed around composite cuff 3302 and foam duct 3304 disposed around composite cuff 3306. In an advantageous embodiment, the composite cuffs are only a few inches long and are bonded inside the ends of the foam ducts so that a solid structure exists around which a clamp can be placed to join foam ducts together.

Thus, composite cuff 3302 has end 3308 and end 3310, shown at the respective phantom lines, with composite cuff 3302 shown as phantom lines inside foam duct 3300 and foam duct 3304. Similarly, composite cuff 3306 has end 3312 and end 3314, shown at the respective phantom lines, with the portion of composite cuff 3306 disposed inside foam duct 3304. Additionally, foam duct 3300 has end 3316 and end 3318, shown at the respective phantom lines. Similarly, foam duct 3304 has end 3318 and end 3320, shown at the respective phantom lines. Thus, foam duct 3300 abuts foam duct 3304 at end 3318 shown at the corresponding phantom line.

Bead 3322 on composite cuff 3302 assist in holding foam duct 3304 in place around composite cuff 3302. Similarly, clamp 3324 assists in holding foam duct 3304 on composite cuff 3302 by compressing the foam behind bead 3322 on composite cuff 3302. Note that bead 3326 on composite cuff 3306 can be used to assist in joining a third foam duct to composite cuff 3306 and foam duct 3304. Other techniques for bonding foam ducts, other than the technique shown in FIG. 33, can be used to bond a foam duct to a composite cuff or to bond a foam duct to a second foam duct.

For all of the advantageous embodiments of foam ducts or sleeves described above, a finely woven thin thermoplastic wire impregnated with a suitable resin matrix can be added to the interior part of a foam duct. In this case, foam for high temperature applications can be silicon based, as opposed to PVDF based. The resin matrix can be elastomeric for flexible ducts and rigid for hybrid ducts. A layer of ceramic membrane may be sandwiched between the inner wire and foam to further diffuse temperature.

Some environmental control system ducts have branch-offs to connect to secondary systems or to customer-specific systems. These branch-offs are often in the shape of a 'T' or '+' cross-section and can be of varied angles. A tool can be provided to create and insert these branch-offs. The tool is in a similar T-shape or '+' cross-section shape corresponding to the branch-offs to be connected. A segmented tool similar to a jigsaw puzzle is used to fabricate parts and then unscrew segments of the tool to release the part.

The foam sleeve and foam duct assemblies shown above avoid a common problem in known duct assemblies. In particular, because the foam used to make the sleeves and ducts are hydrophobic (meaning that the foam does not retain water) foam ducts and sleeves resist sweating or condensation. Thus, addition of insulation systems, which are expensive and heavy, can be avoided in many cases. Sweating or condensation on ducts can produce unpleasant effects in a passenger cabin of an aerospace vessel, such as blowing a fine mist of water onto the passengers through the environmental control system. This effect is considered to be undesirable and is to be avoided.

Figure 34:
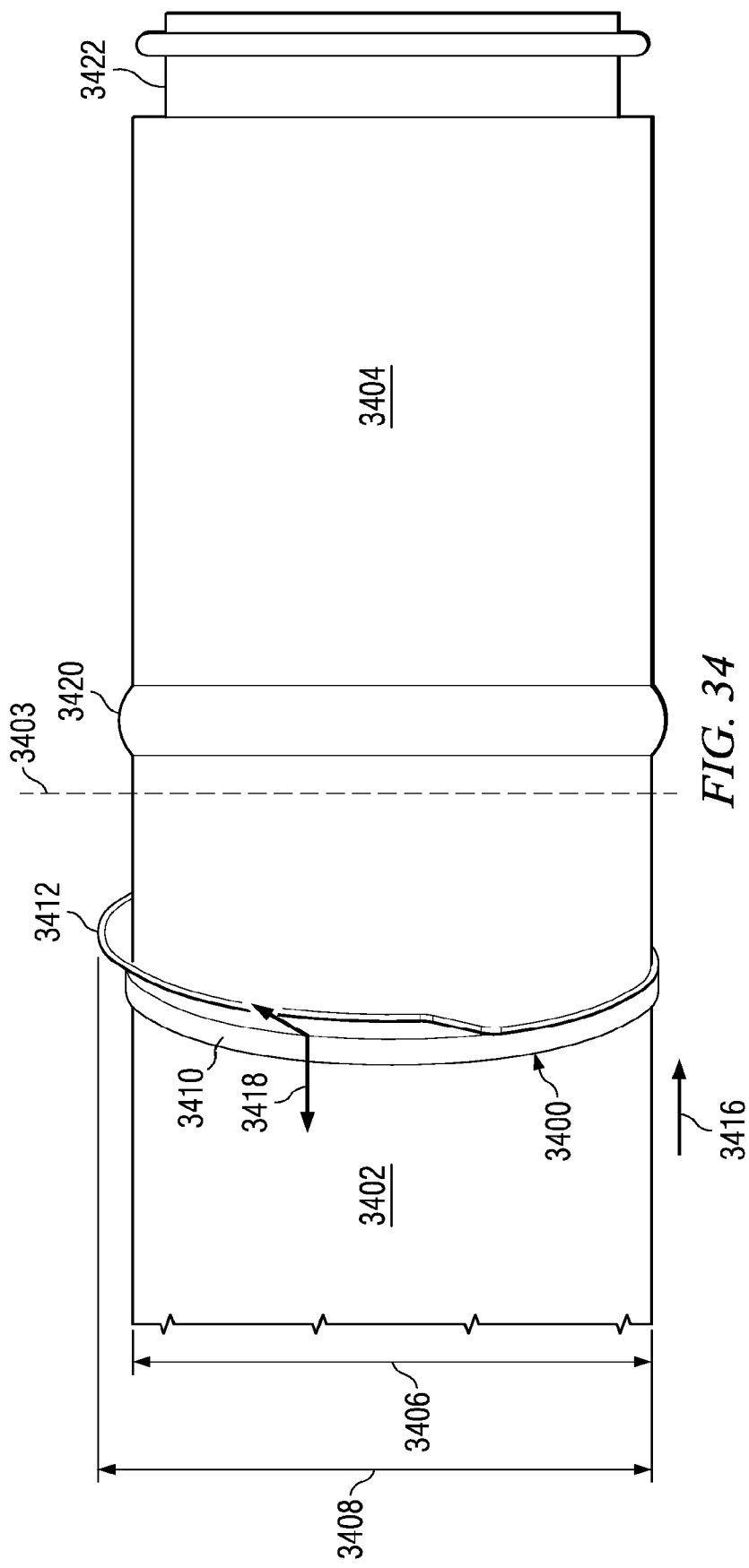
FIG. 34 shows a ring clamp disposed around a foam duct, in accordance with an advantageous embodiment.

FIG. 34 shows a ring clamp disposed around a foam duct, in accordance with an advantageous embodiment. Clamp 3400 can be used to join duct 3402 and duct 3404 together. As shown, duct 3402 and duct 3404 are joined at phantom line 3403. Clamp 3400 self-adjusts to the demanded applied pressure, requires no tools to fashion, and is lightweight and inexpensive. Clamp 3400 can be referred to as a "Patel clamp."

Clamp 3400 is made from a composite, non-hydroscopic material, such as Nylon 12 (polyamide) or polypropylene so that when used in humid conditions, the clamp does not cause material relaxation. For this reason, clamp 3400 can replace steel clamps in an environmental control system of an aerospace vessel. Clamp 3400 has a minimum inner diameter, as shown by arrows 3406. The minimum inner diameter corresponds to about an outside diameter of duct 3402. Clamp 3400 has a maximum inside diameter as shown by arrows 3408.

Clamp 3400 has two different sections for purposes of description. Namely, full ring 3410 is a ring that is sized and dimensioned to wrap fully around the diameter of duct 3402. Partial ring 3412 is attached to full ring 3410, though in an advantageous embodiment partial ring 3412 is an integral, continuous part of full ring 3410. Partial ring 3412 has an outwardly flaring radius along the direction shown by arrows 3416. Thus, partial ring 3412 forms part of a frustro-conical shape. Angle 3418 defines the steepness of frustro-conical partial ring 3412 and also defines the angle between full ring 3410 and partial ring 3412. In an advantageous embodiment, angle 3418 can be about 30 degrees, though angle 3418 can vary between about 0 degrees to about 180 degrees.

Bulge 3420 is a bulge in the foam sleeve or duct due to a bead on a composite cuff disposed inside foam duct 3402 and duct 3404. Thus, one manner of calculating the maximum inside diameter of full ring 3410 is by adding the outside diameter of the bead plus two times the foam thickness, less two times the compression of foam required to prevent the sleeve from slipping off the duct.

In use, the shape of clamp 3400 facilitates pulling clamp 3400 over a duct. Specifically, partial ring 3412 forms a handle, guide, and stop used when placing clamp 3400 over ducts 3402 and 3404. In an advantageous embodiment, clamp 3400 is pulled over duct 3402 in the direction shown by arrow 3416. Additionally, partial ring 3412 snugly abuts bulge 3420 when clamp 3400 is fully engaged. In this manner, when forces act to pull the ducts apart, partial ring 3412 abuts the bead, digging full ring 3410 into the foam ducts, making the ring tighter. This configuration acts like a "finger trap." Note that clamp 3400 has an inside diameter that is larger than the bead so clamp 3400 can be installed from any end of the duct. Thus, for example, clamp 3400 can be pulled over duct 3402 when duct 3404 and composite cuff 3422 are difficult to reach. In this manner, clamp 3400 can be used to join duct 3402 to duct 3404, wherein duct 3402 has an integral cuff bonded to its end.

This configuration can be repeated to join multiple ducts together. For example, composite cuff 3422 is bonded to the end of duct 3404. A third foam duct can be joined to duct 3404 using a second foam clamp, similar to clamp 3400, that is slipped over composite cuff 3422. In an advantageous embodiment, duct 3402 and duct 3404 can be foam ducts.

Clamp 3400 in an advantageous embodiment has a thickness of approximately 0.03 inches and a width of approximately 0.5 inches. In other advantageous embodiments, these dimensions can be increased or reduced as desired for the intended use of clamp 3400.

In an advantageous embodiment, clamp 3400 is made of a single piece of non-hydroscopic (non-water retaining) composite, so that when clamp 3400 is applied to a duct, clamp 3400 is light weight and does not relax with moisture or temperatures common to aircraft ducts. Clamp 3400 can be injection molded for low cost.

In another advantageous embodiment, the entire assembly of clamp 3400, duct 3402, and duct 3404 can be subjected to heat and/or pressure for a predetermined period, thereby thermally welding clamp 3400 to ducts 3402 and 3404 and permanently sealing the two ducts together. In this manner, the bond between duct 3402 and duct 3404 can be made resistant to tearing, breaking, or leaking.

In some advantageous embodiments, where the duct and sleeve combination are expected to handle lower-end loads, a reinforced foam sleeve slid over a bead provides sufficient clamping force to eliminate entirely the need for a clamp. Thus, this advantageous embodiment further reduces the weight added to the environmental control system of an aerospace vessel. Optionally, a bead can be reshaped to better trap a foam sleeve once the foam sleeve is passed the bead or bead radius. For example, the shape of a bead can be varied from the quarter circle a full D-shape, an O-shape, or any other desired shape.

FIG. 35 shows a duct around which is wound a preformed helix wire, in which a pitch bar is used to form the wire into a helix, in accordance with an advantageous embodiment. Thus, FIG. 35 illustrates a method of applying a helix to all or part of a foam duct, such as foam duct 3500 or the foam ducts shown in the preceding figures.

Wire 3502 is wrapped around foam duct 3500 using pitch tool 3504 to form a helix around foam duct 3500. Pitch tool 3504 ensures that the pitch of the helix is uniform. The pitch of the helix is the distance between any two coils of the helix, such as the distance shown between arrows 3506.

In an advantageous embodiment, wire 3502 is formed from materials such as polyetherimide or polyetheretherketone, which results in providing superior stiffness, strength, and bonding with less weight and cost. Wire 3502 is secured to foam duct 3500 by thermally bonding wire 3502 to foam duct 3500, though adhesive bonding can also be used in other advantageous embodiments. Thermal bonding has the advantage that air pockets do not form at the edges between wire 3502 and foam duct 3500.

Additionally, the configuration shown in FIG. 35 eliminates any requirement for an outer-ply or additional layer of reinforced elastomeric wires, or incorporation of a cord to contain the helix. Thus, this configuration aids in preventing stress failures in foam duct 3500.

In an advantageous embodiment, foam duct 3500 is rotated about a spindle or on a mandrel in order to facilitate the layering of wire 3502 using pitch tool 3504. In an advantageous embodiment, after wire 3502 is completely disposed around foam duct 3500 and along the length of foam duct 3500, the entire part is placed into an oven and cured. The curing process fuses wire 3502 to foam duct 3500.

Figure 36:
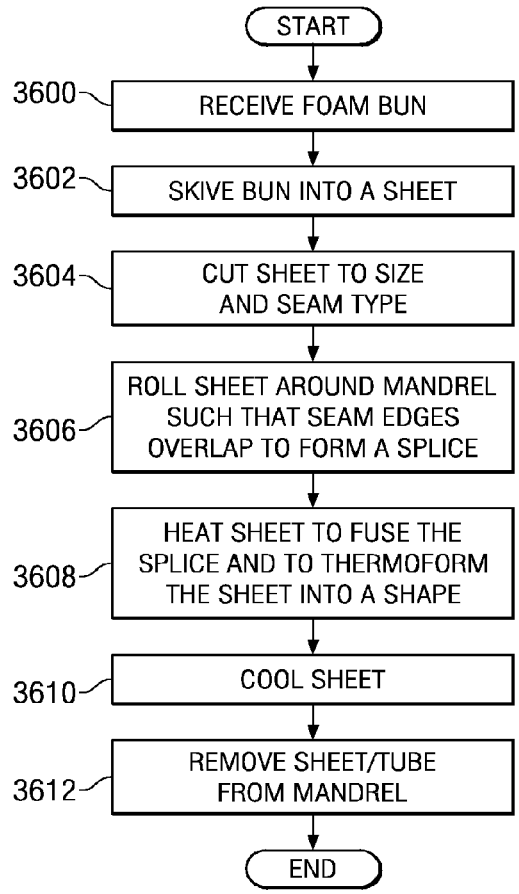
FIG. 36 is a flowchart illustrating a process of converting a foam bun into a foam duct, in accordance with an advantageous embodiment.

FIG. 36 is a flowchart illustrating a process of converting a foam bun into a foam duct, in accordance with an advantageous embodiment. The process shown in FIG. 36 can be implemented using an apparatus, such as apparatus 500 shown on FIG. 5.

The process begins as a foam bun is received (step 3600). The bun is skived into a sheet (step 3602). The sheet is then cut to a size and seam type (step 3604). The seam type can be one of numerous seam types, such as those shown in FIG. 6 through FIG. 12C.

Next, the sheet is rolled around a mandrel, such that seam edges overlap to form a splice (step 3606). Heat and pressure are applied to the seam and duct for a period of time (step 3608). The sheet is cooled (step 3610), and removed from the mandrel (step 3612). At this point, the sheet is now a duct tube. Other post-processes can be applied to the foam duct after this point.

Figure 37:
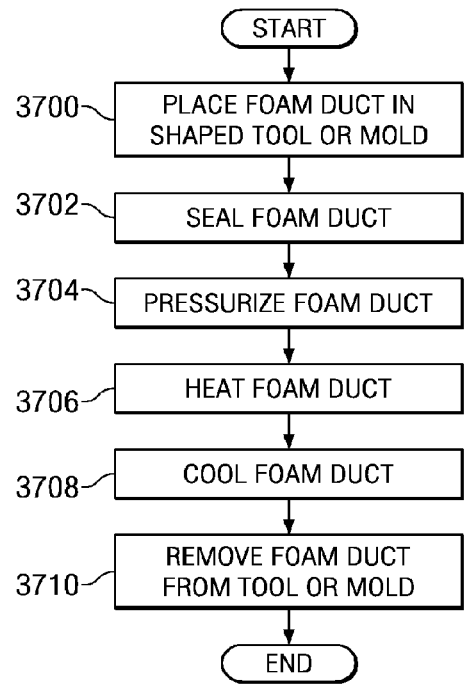
FIG. 37 is a flowchart illustrating a process of pressure forming a foam duct into a more complex shape, in accordance with an advantageous embodiment.

FIG. 37 is a flowchart illustrating a process of pressure forming a foam duct into a more complex shape, in accordance with an advantageous embodiment. The process shown in FIG. 37 can be implemented using an apparatus or mold such as the apparatus and mold shown in FIG. 5.

The process begins as an existing formed foam duct is placed into a shaped tool or mold (step 3700). The foam duct ends are then sealed with an airtight seal (step 3702). The inside of the foam duct is pressurized (step 3704), and then the foam duct is heated (step 3706). After a time, the foam duct is cooled (step 3708) and then removed from the tool or mold (step 3710). Other post processes are possible from this point to further shape the foam duct.

Figure 38:
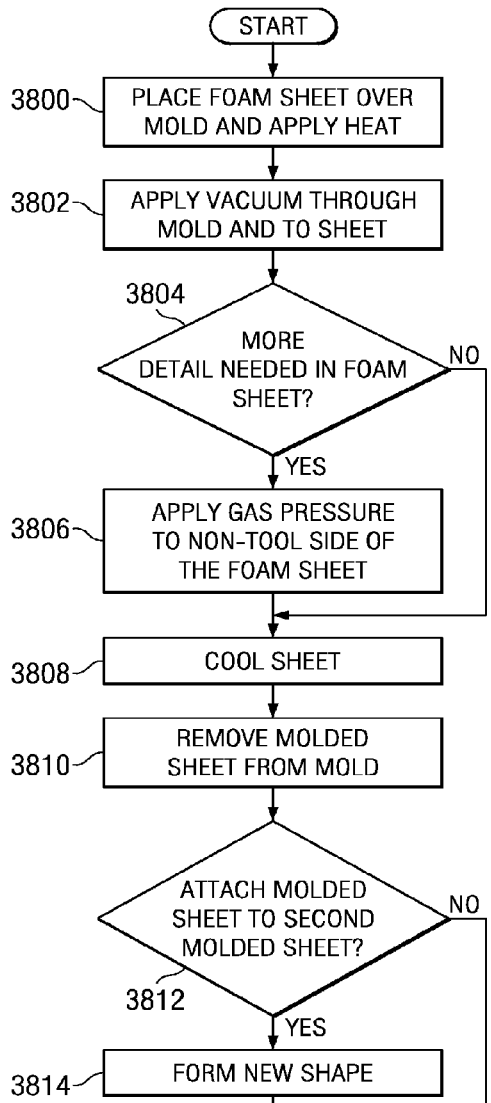
FIG. 38 is a flowchart illustrating a process of forming a shaped foam duct using vacuum and/or pressure, in accordance with an advantageous embodiment.

FIG. 38 is a flowchart illustrating a process of forming a shaped foam duct using heat, vacuum, and/or pressure, in accordance with an advantageous embodiment. The process begins by placing a sheet over a mold and applying heat (step 3800). A vacuum is then applied through the mold and to the sheet (step 3802).

A decision is then made whether more detail is needed in the foam sheet (step 3804). If more detail is desired ('yes' output to step 3804), then gas pressure is applied on the non-tool side of the foam sheet (step 3806). After this step, or if no more detail is desired ('no' output to step 3804), then the sheet is cooled (step 3808). The cooled sheet is then removed from the mold (step 3810). A determination is then made as to whether the molded sheet is attached to a second molded sheet (step 3812). If the molded sheet is attached to a second molded sheet ('yes' output to step 3812), the process forms a new shape (step 3814), with the process terminating thereafter. If the molded sheet is not attached to a second molded sheet ('no' output to step 3812), the process terminates.

Figure 39:
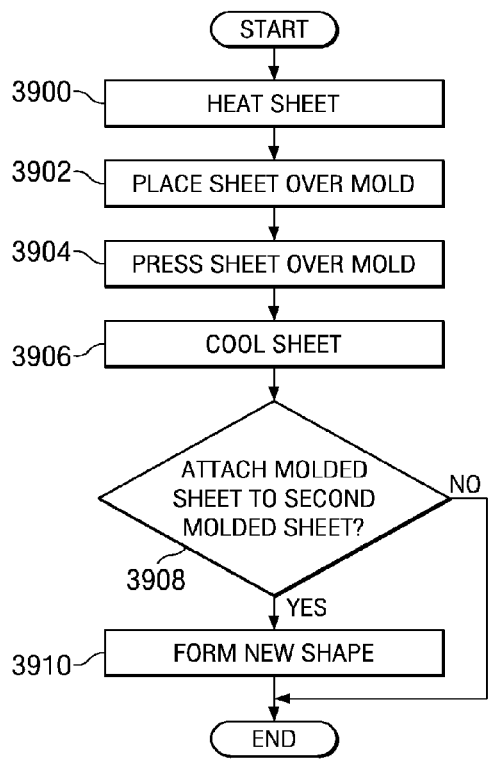
FIG. 39 is a flowchart illustrating a process of press forming a shaped duct, in accordance with an advantageous embodiment.

FIG. 39 is a flowchart illustrating a process of press forming a shaped duct, in accordance with an advantageous embodiment. The process begins by heating the sheet (step 3900) and placing the heated sheet over a heated mold (step 3902). The sheet is then pressed over a mold (step 3904) and cooled (step 3906). A determination is then made as to whether the molded sheet is attached to a second molded sheet (step 3908). If the molded sheet is attached to a second molded sheet ('yes' output to step 3908), the process forms a new shape (step 3910) and terminates thereafter. If the molded sheet is not attached to a second molded sheet ('no' output to step 3908), the process terminates.

Figure 40:
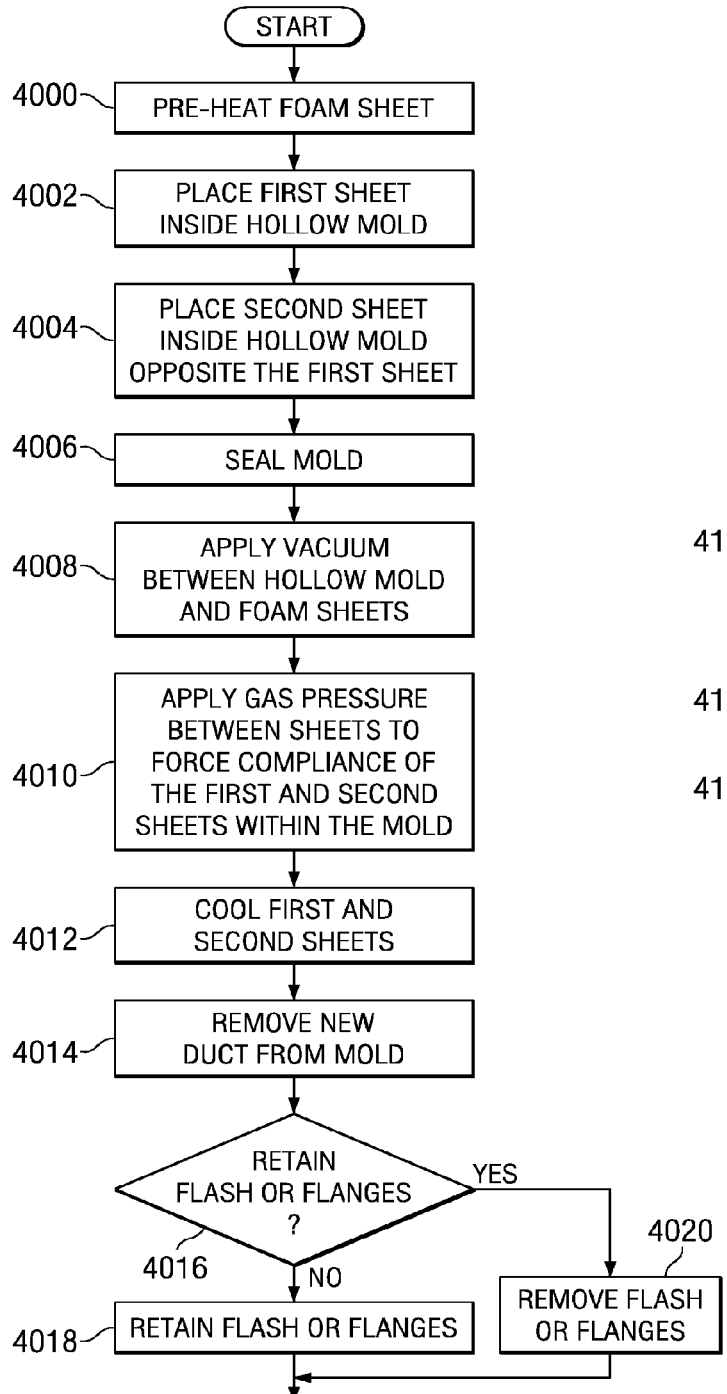
FIG. 40 is a flowchart illustrating a process of directly forming a duct using a multi-sheet forming process, in accordance with an advantageous embodiment.

FIG. 40 is a flowchart illustrating a process of directly forming a duct using a multi-sheet forming process, in accordance with an advantageous embodiment. The process begins by heating the molds and pre-heating a foam sheet (step 4000), and then placing a first foam sheet inside a hollow mold (step 4002). A second heated foam sheet is placed inside the hollow mold opposite the first foam sheet (step 4004). The mold is then sealed (step 4006). A vacuum can be applied between the hollow mold and the foam sheets (step 4008). Alternatively or in addition to the application of a vacuum, gas pressure can be applied between the foam sheets to force compliance of the first and second foam sheets with the mold (step 4010). After a time; the first and second sheets are cooled (step 4012). The new foam duct is then removed from the mold (step 4014).

If flash or flanges are created during this process, a determination is then made as to whether to retain the flash or flanges (step 4016). If no flash or flanges are created, then step 4016 is skipped and the process terminates. If flash or flanges are formed, and if flash or flanges are to be retained (a 'yes' output to step 4016), the flash and flanges are retained (step 4018), with the process terminating thereafter. However, if flash or flanges are not to be retained (a 'no' output to step 4016), the flash and flanges are removed (step 4020), with the process terminating thereafter.

Figure 41:
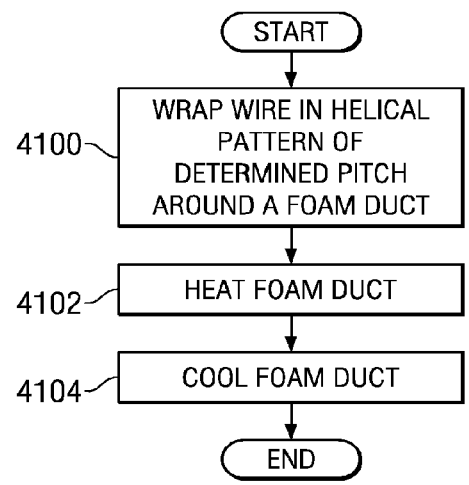
FIG. 41 is a flowchart illustrating a process of pre-forming a composite helix, in accordance with an advantageous embodiment.

FIG. 41 is a flowchart illustrating a process of pre-forming a composite helix, in accordance with an advantageous embodiment. The process begins by wrapping a wire in a helical pattern of determined pitch around a foam duct (step 4100). The wire is made of a thermoplastic material, though the wire can be made of any suitable material such as foam, plastic, or metal in other advantageous embodiments. The foam duct is then heated (step 4102) and, after a time, cooled (step 4104), with the process terminating thereafter.

Figure 42:
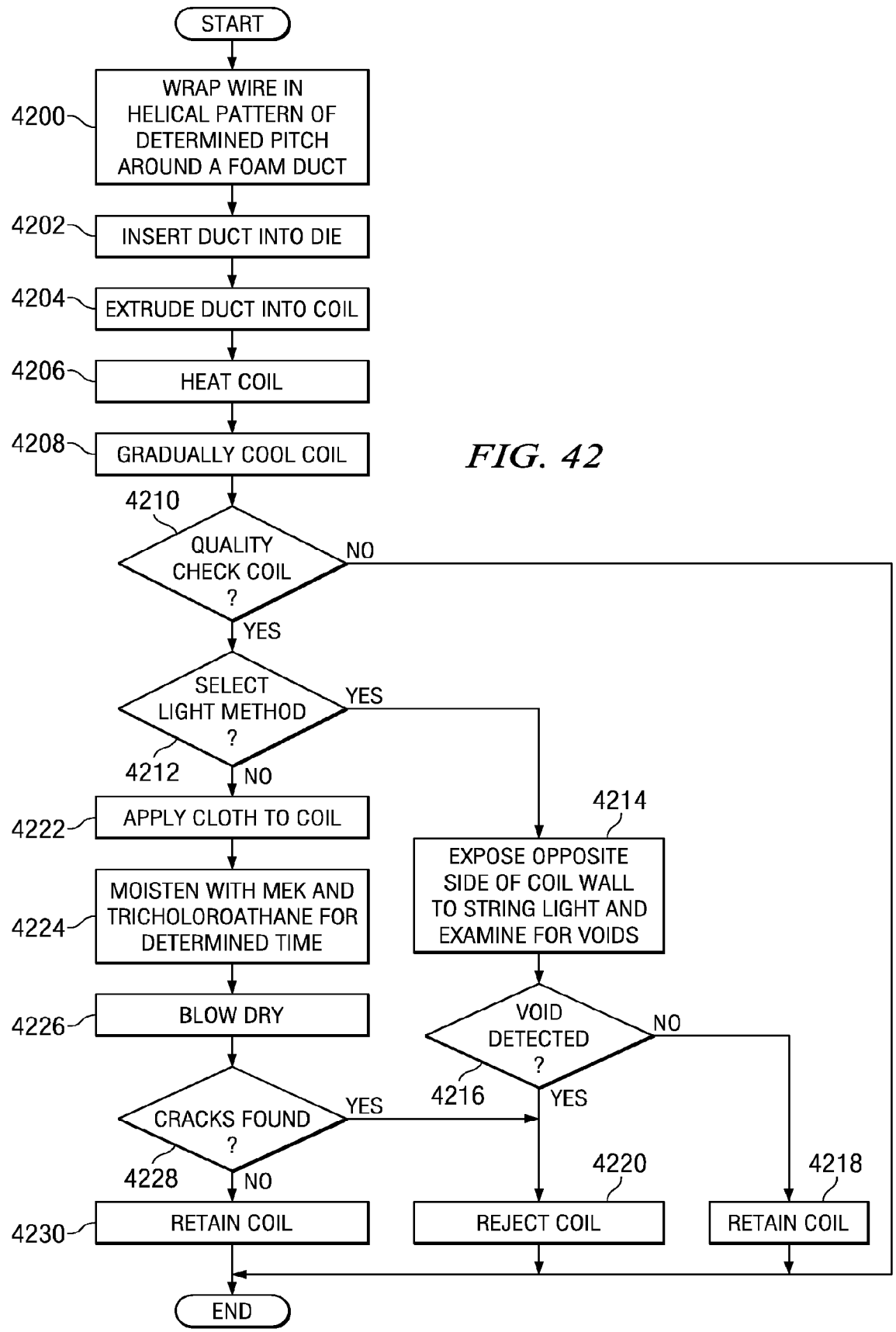
FIG. 42 is a flowchart illustrating a process of forming composite wire for use as a helix around foam ducts, in accordance with an advantageous embodiment.

FIG. 42 is a flowchart illustrating a process of forming composite wire for use as a helix around foam ducts, in accordance with an advantageous embodiment. The process begins by wrapping a wire in a helical pattern of determined pitch around a foam duct (step 4200). The wire is made of a thermoplastic material, though the wire can be made of any suitable material such as foam, plastic or metal in other advantageous embodiments. The foam duct is inserted into die (step 4202) and extruded into a coil (step 4204). The coil is heated (step 4206) and gradually cooled (step 4208).

A determination is then made as to whether to quality check the coil (step 4210). If no quality check is to be made of the coil ('no' output to step 4210), the process terminates. If the coil is to be quality checked ('yes' output to step 4210), a determination is made as to whether to utilize the light method (step 4212). If the light method is selected ('yes' output to step 4212), the opposite side of the coil wall is exposed to strong light and examined for voids (step 4214). A determination is made as to whether a void has been detected (step 4216). If a void has not been detected ('no' output to step 4216), the coil is retained (step 4218), with the process terminating thereafter. If a void has been detected ('yes' output to step 4216), the coil is rejected (step 4220), with the process terminating thereafter.

Returning now to step 4212, if the light method is not selected ('no' output to step 4212), a cloth is applied to the coil (step 4222) and moistened with MEK and Tricholoroathane for a determined time (step 4224). The coil is then blow-dried (step 4226), and a determination is made as to whether cracks are found in the coil (step 4228). If cracks are found in the coil ('yes' output to step 4228), the coil is rejected (step 4220), with the process terminating thereafter. If no cracks are found in the coil ('no' output to step 4228), the coil is retained (step 4230), with the process terminating thereafter.

Figure 43:
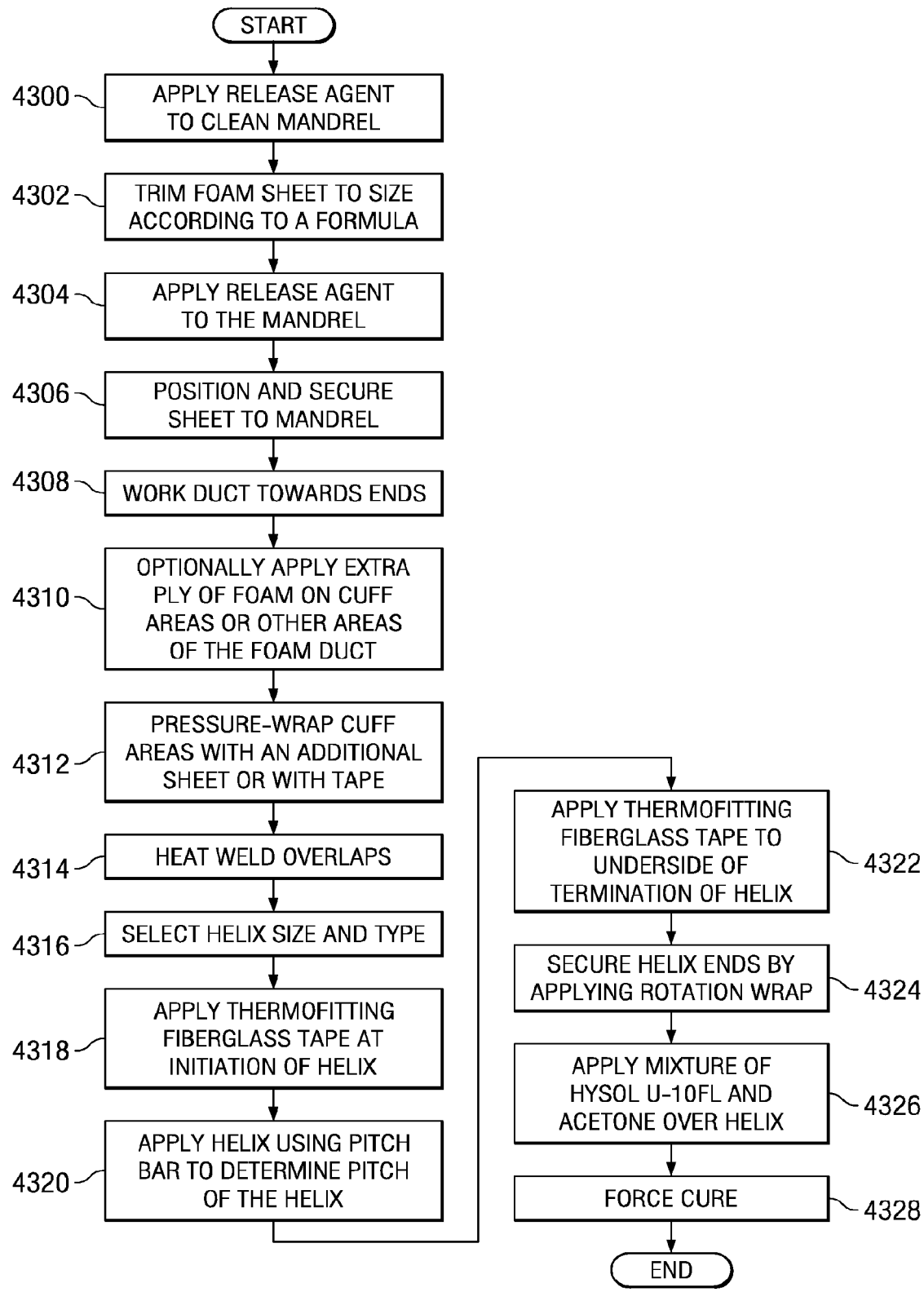
FIG. 43 is a flowchart illustrating a process of forming a flex duct by combining foam and a helical wire around a mandrel, in accordance with an advantageous embodiment.

FIG. 43 is a flowchart illustrating a process of forming a flex duct by combining foam and a helical wire around a mandrel, in accordance with an advantageous embodiment. The process begins by applying a release agent to the clean mandrel (step 4300). The foam sheet is trimmed to size according to a formula (step 4302). A release agent is applied to the mandrel (step 4304). A release agent can be release tape, Teflon® (polytetrafluoroethylene), or some other release liquid or solid suitable for assisting in releasing a foam sheet or duct from the mandrel. Then, the foam sheet is positioned and secured to the mandrel (step 4306).

A pressure-wrap sheet overlaps at the center of the formed duct, and the duct is worked towards the ends (step 4308). Optionally, an extra ply of foam is applied on the cuff or sleeve or on other areas of the foam duct (step 4310). The cuff areas are pressure-wrapped with an additional sheet or with tape (step 4312) and the overlaps are heat welded (step 4314). The helix size and type are selected (step 4316) and thermofitting fiberglass tape is applied at the initiation of the helix (step 4318). The helix is applied using a pitch bar to determine the pitch of the helix (step 4320). Thermofitting fiberglass tape is then applied to the underside of the termination of the helix (step 4322) and the helix ends are secured by applying a rotation wrap (step 4324). A mixture of HYSOL U-10FL and acetone is applied over the helix (step 4326). Finally, the duct is force cured (step 4328), with the process terminating thereafter.

Figure 44:
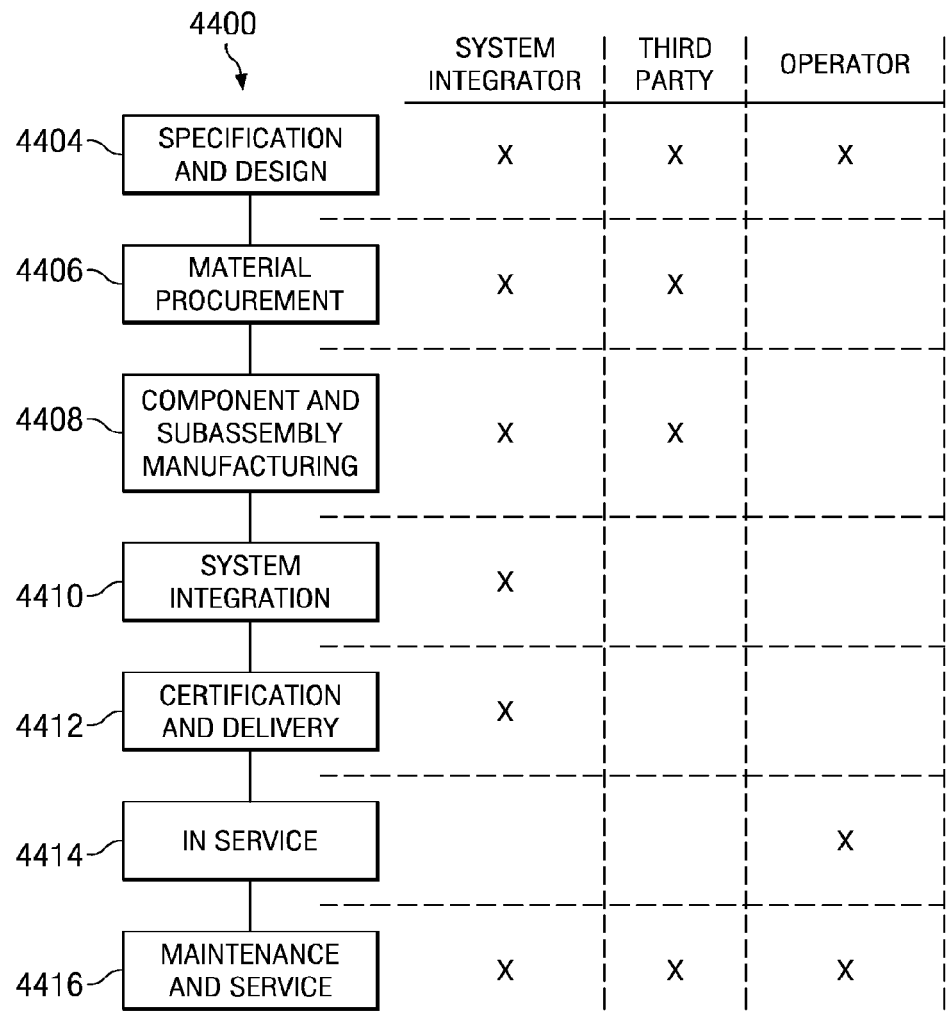
FIG. 44 is a flow diagram of aerospace vessel production and service method, in accordance with an advantageous embodiment.
Figure 45:
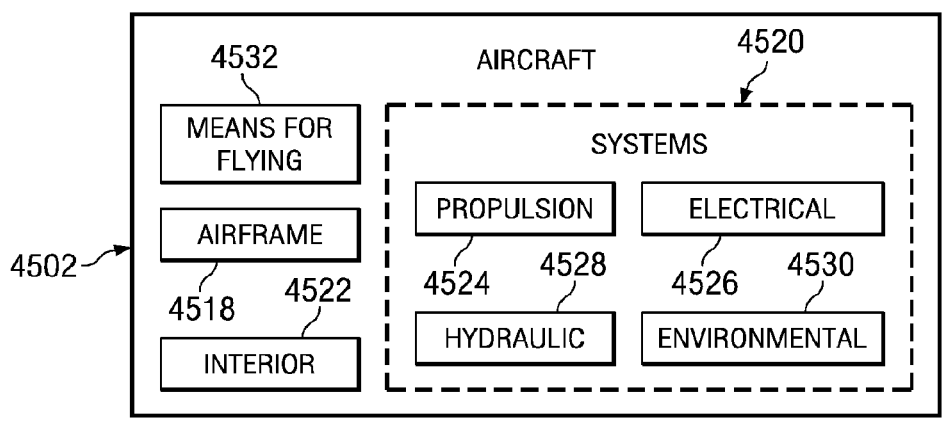
FIG. 45 is a block diagram of an aerospace vessel, in accordance with an advantageous embodiment.

FIG. 44 is a flow diagram of aerospace vessel production and service method, in accordance with an advantageous embodiment. FIG. 45 is a block diagram of an aerospace vessel, in accordance with an advantageous embodiment. The advantageous embodiments described herein may be further described in the context of an aerospace vessel manufacturing and service method 4400 as shown in FIG. 44 and in the context of aerospace vessel 4502 as shown in FIG. 45.

During pre-production, exemplary service method 4400 may include specification and design 4404 of the aerospace vessel 4502 and material procurement 4406. During production, component and subassembly manufacturing 4408 and system integration 4410 of the aerospace vessel 4502 takes place. Thereafter, the aerospace vessel 4502 may go through certification and delivery 4412 in order to be placed in service 4414. While in service by a customer, the aerospace vessel 4502 is scheduled for routine maintenance and service 4416 (which may include modification, reconfiguration, refurbishment, and so on).

Each of the processes of service method 4400 may be performed or carried out by a system integrator, a third party, and/or an operator, such as a customer, as indicated by the "X" in the grid to the right of the flow diagram of FIG. 44. For the purposes of this description, a system integrator may include without limitation any number of aerospace vessel manufacturers and major-system subcontractors; a third party may include without limitation any number of venders, subcontractors, and suppliers; and an operator may be an airline, leasing company, military entity, service organization, and so on.

As shown in FIG. 45, the aerospace vessel 4502 produced by exemplary service method 4400 may include an airframe 4518 with a plurality of systems 4520 and an interior 4522. Examples of high-level systems 4520 include one or more of a propulsion system 4524, an electrical system 4526, a hydraulic system 4528, and an environmental system 4530. Environmental system 4530 can be an environmental control system, as described with respect to the advantageous embodiments provided herein. The aerospace vessel further comprises wings, turbine engines, jets, rocket engines, gas, helicopter blades, or other means for flying 4532 that can cause the aerospace vessel to fly. Means for flying 4532 can also be means for causing a fuselage to fly.

The apparatuses and methods embodied herein may be employed during any one or more of the stages of the production and service method 4400. For example, components or subassemblies corresponding to component and subassembly manufacturing 4408 may be fabricated or manufactured in a manner similar to components or subassemblies produced while the aerospace vessel 4502 is in service. Also, one or more apparatus embodiments, method embodiments, or a combination thereof may be utilized during production stages 4408 and 4410, for example, by substantially expediting assembly or reducing the cost of an aerospace vessel 4502. Similarly, one or more apparatus embodiments, method embodiments, or a combination thereof may be utilized while the aerospace vessel 4502 is in service, for example and without limitation, to maintenance and service 4416.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method of forming a duct, the method comprising the steps of:
   skiving a thermoplastic bun having a closed cell structure to form a sheet, the bun comprising an expanded foam polyvinylidene fluoride (PVDF) material;
   cutting the sheet to create a first edge and a second edge of the sheet;
   forming a crenulation pattern in the first edge of the sheet so as to form a first crenulated edge;
   forming a crenulation pattern in the second edge of the sheet so as to form a second crenulated edge;
   cutting the first crenulated edge so as to create a bevel along the first crenulated edge;
   cutting the second crenulated edge so as to create a bevel along the second crenulated edge, the first crenulated edge reciprocally matching the second crenulated edge;
   wrapping the sheet around a mandrel;
   applying pressure and heat to thermally weld the first edge and the second crenulated edge together so as to form the duct; and
   welding a wire around the duct, the wire comprising a thermoplastic material, the wire wrapped around the duct in a helix pattern, wherein the pitch of the helix is selected to dampen a noise of a given frequency range;
   wherein the step of applying pressure and heat comprises pressing an outside tool against an overlapping seam of the first edge and the second edge.

2. The method of claim 1, wherein an angle of the helix is selected to dampen a noise of a given frequency range.

3. A method of forming a duct and attaching it to an environmental control system of an aircraft the method comprising the step of:
   skiving a sheet from a bun that is expanded into a foam from a polyvinylidene fluoride (PVDF) material;
   cutting the sheet to create a first edge and a second edge;
   crenulating a first edge of the sheet so as to form a first crenulated edge;
   crenulating the second edge of the sheet so as to form a second crenulated edge;
   cutting the first crenulated edge so as to create a bevel along the first crenulated edge;
   cutting the second crenulated edge so as to create a bevel along the second crenulated edge, the first crenulated edge reciprocally matching the second crenulated edge;
   thermally welding the first crenulated edge to the second crenulated edge to form the duct;
   attaching the duct to the environmental control system of the aircraft;
      wherein the duct is a first duct and wherein the environmental control system further comprises a second duct; and
   coupling the first duct to the second duct using a foam sleeve comprising a polyvinylidene fluoride foam.

4. The method of claim 3, wherein the first duct and the foam sleeve are coupled using a clamp comprising a first section in the shape of a ring and a second section comprising a partial frustro-conical shape attached to the first section.

5. The method of claim 3, wherein the first duct, the second duct, and the foam sleeve are coupled using an adhesive.

6. A method of forming a duct, the method comprising the steps of:
   skiving a thermoplastic bun having a closed cell structure to form a sheer, the bun comprising an expanded foam polyvinylidene fluoride (PVDF) material;
   cutting the sheet to create a first edge and a second edge of the sheet;
   forming a crenulation pattern in the first edge of the sheet so as to form a first crenulated edge;
   forming a crenulation pattern in the second edge of the sheet so at to form a second crenulated edge;
   cutting the first edge so as to create a bevel along the first crenulated edge;
   cutting the second crenulated edge so as to create a bevel along the second crenulated edge, the first crenulated edge reciprocally matching the second crenulated edge;
   wrapping the sheet around a mandrel;
   applying pressure and heat to thermally weld the first crenulated edge and the second crenulated edge together so as to form the duct;
   molding the duct in a mold; and
   post forming the duct with injected gas and heat;
   wherein the step of applying pressure and heat comprises pressing an outside tool against an overlapping seam of the first edge and the second edge.

* * * * *